(12) United States Patent
Murai et al.

(10) Patent No.: US 10,310,084 B2
(45) Date of Patent: Jun. 4, 2019

(54) RANGE IMAGING APPARATUS AND RANGE IMAGING METHOD

(71) Applicant: PANASONIC INTELLECTUAL PROPERTY MANAGEMENT CO., LTD., Osaka (JP)

(72) Inventors: Yoshihiko Murai, Osaka (JP); Shinji Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 364 days.

(21) Appl. No.: 15/207,365

(22) Filed: Jul. 11, 2016

(65) Prior Publication Data

US 2016/0320486 A1   Nov. 3, 2016

Related U.S. Application Data

(63) Continuation of application No. PCT/JP2015/000015, filed on Jan. 6, 2015.

(30) Foreign Application Priority Data

Jan. 14, 2014   (JP) ................. 2014-004479

(51) Int. Cl.
*G01S 17/08*     (2006.01)
*G01S 17/10*     (2006.01)
(Continued)

(52) U.S. Cl.
CPC ............... *G01S 17/08* (2013.01); *G01C 3/08* (2013.01); *G01S 7/4868* (2013.01); *G01S 17/10* (2013.01); *G01S 17/89* (2013.01)

(58) Field of Classification Search
CPC .......... G01S 7/493; G01S 17/36; G01S 17/87; G01S 17/89; G01S 7/4915; G01C 3/08
See application file for complete search history.

(56) References Cited

U.S. PATENT DOCUMENTS 6,141,105 A   10/2000   Yahashi et al.
6,442,345 B1   8/2002   Kindaichi
(Continued)

FOREIGN PATENT DOCUMENTS

CN   1274864 A      11/2000
JP   2001-116516 A   4/2001
(Continued)

OTHER PUBLICATIONS

International Search Report and Written Opinion issued in corresponding International Patent Application No. PCT/JP2015/000015, dated Mar. 17, 2015; with partial English translation.
(Continued)

*Primary Examiner* — Luke D Ratcliffe
(74) *Attorney, Agent, or Firm* — McDermott Will & Emery LLP

(57) ABSTRACT

A range imaging apparatus includes a light illuminator that emits signal light from a light source toward a subject; a light receiver that receives light reflecting off the subject; a range image generator that calculates a distance value to the subject based on a time difference between emission and light reception, and generates a range image; a distance value distribution analyzer that calculates a distribution characteristic of the distance value calculated by the range image generator; an illumination controller that adjusts output of the light illuminator; an exposure controller that adjusts exposure by the light receiver; and a signal adjuster that adjusts the illumination controller and the exposure controller based on the distribution characteristic. The signal adjuster adjusts at least one of the illumination controller and the exposure controller for the second signal light based on the distribution characteristic obtained through emission and light reception of the first signal light.

10 Claims, 29 Drawing Sheets

(51) Int. Cl.
*G01S 17/89* (2006.01)
*G01S 7/486* (2006.01)
*G01C 3/08* (2006.01)

(56) References Cited

U.S. PATENT DOCUMENTS

| | | | |
|---|---|---|---|
| 2008/0231832 A1* | 9/2008 | Sawachi | G01S 7/493 356/5.1 |
| 2008/0237445 A1 | 10/2008 | Ikeno et al. | |
| 2012/0177252 A1 | 7/2012 | Korekado et al. | |

FOREIGN PATENT DOCUMENTS

| | | |
|---|---|---|
| JP | 2011-064498 A | 3/2011 |
| JP | 2011-179997 A | 9/2011 |
| JP | 2012-225807 A | 11/2012 |

OTHER PUBLICATIONS

Office Action and search report dated Nov. 14, 2018 issued in corresponding CN patent application No. 201580003765.3.
Japanese Office Action issued in Japanese Patent Application No. 2015-557761, dated Jan. 8, 2019.

* cited by examiner

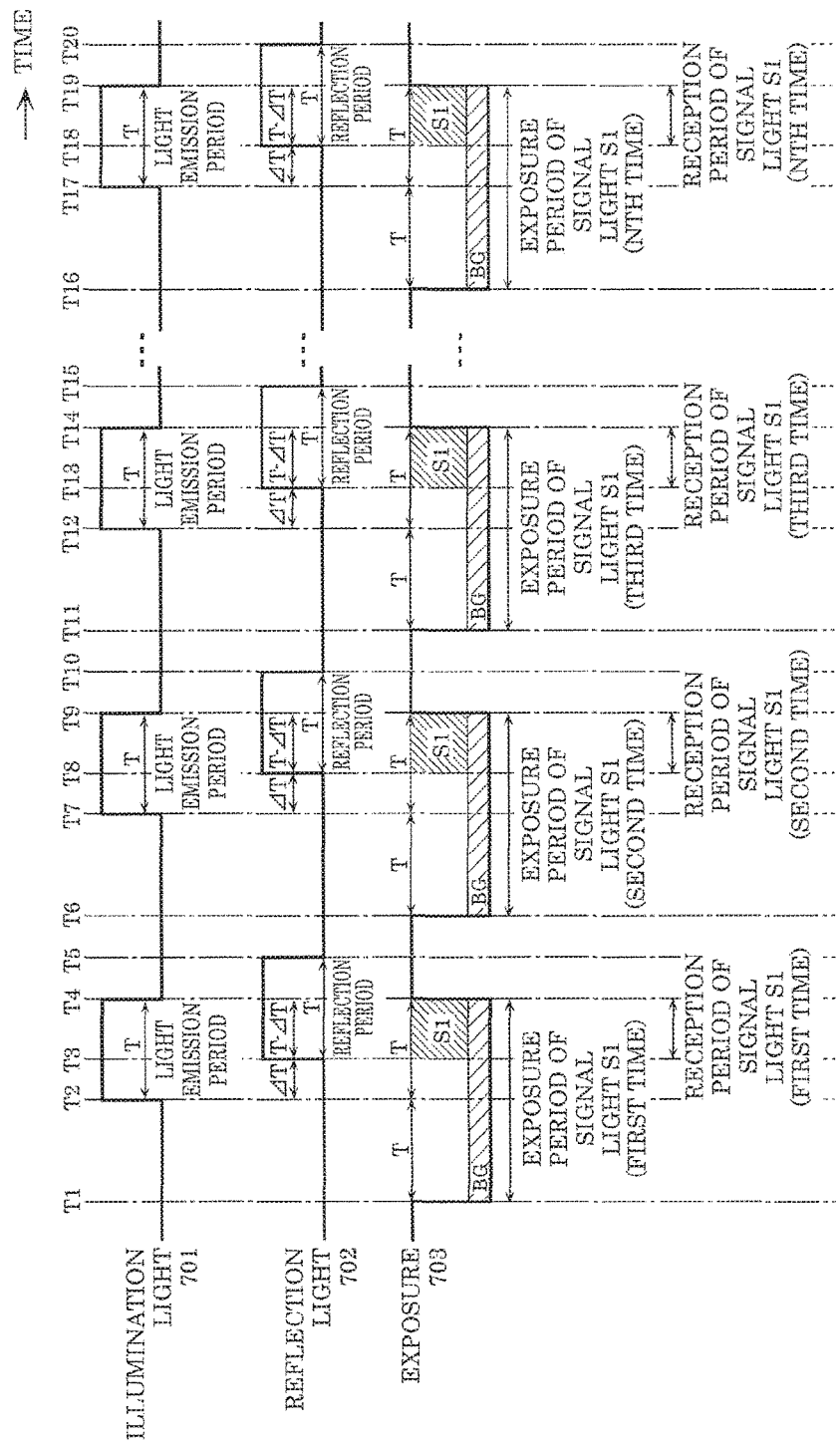

RANGE IMAGING APPARATUS AND RANGE IMAGING METHOD

CROSS REFERENCE TO RELATED APPLICATION

This application is a U.S. continuation application of PCT International Patent Application Number PCT/JP2015/000015 filed on Jan. 6, 2015, claiming the benefit of priority of Japanese Patent Application Number 2014-004479 filed on Jan. 14, 2014, the entire contents of which are hereby incorporated by reference.

BACKGROUND OF THE INVENTION

1. Technical Field

The present disclosure relates to a range imaging apparatus and a range imaging method using a time-of-flight (TOF) system in which distance information of a subject is obtained based on the time difference arising between signal light and reflection light when the signal light is emitted toward, reaches and reflects off the subject, and the reflection light is received.

2. Description of the Related Art

In recent years, with the size reduction of equipment and the advent of products for general consumers, more attention has been directed toward apparatuses and methods for generating an image having distance-measuring information of a subject (in the following, referred to as a range image) not only for use in the traditional fields of gaming and amusement but also in the application and technological development in various fields such as medical care and advertisements.

The methods of measuring the distance of a subject for range imaging include several methods such as range imaging based on parallax of images picked up by a plurality of cameras; and a method of illuminating a subject with a known random dot pattern and generating a range image based on a distortion of the dot pattern. As one example of these methods, there is a TOF system in which infrared light or a laser beam is emitted toward a subject and the distance to the subject is calculated (measured) based on measurement time the infrared light or the laser beam has taken to reach the subject, reflect off the subject and be received.

Obviously, the control flexibility increases in keeping with the accuracy of measuring the distance to the subject. The TOF system utilizes a signal amount obtained by exposure of light reflecting off the subject. Thus, by appropriately adjusting the emission of signal light for illumination and the exposure of reflection light to be received according to the distance from an imaging point to the subject and a surface reflectivity of the subject, it is possible to prevent received light signal from being saturated and an S/N ratio from declining, so that the accuracy of distance measurement will improve and the range imaging will be performed with enhanced accuracy.

In one conventional technology, when a highly accurate synthetic range image is to be generated, a plurality of range images with different exposures are obtained and compared pixel by pixel so as to generate the synthetic range image (see Japanese Unexamined Patent Application Publication No. 2012-225807).

In the other conventional technology, the light emission amount (power consumption) is adjusted to a minimum level necessary for measuring the distance to the subject based on distribution characteristics of distance values of the obtained range image (see Japanese Unexamined Patent Application Publication No. 2011-179997).

SUMMARY

In the range image synthesizing method disclosed in Japanese Unexamined Patent Application Publication No. 2012-225807, when a highly accurate synthetic range image is to be generated, a plurality of range images with different exposures are obtained and compared pixel by pixel so as to generate the synthetic range image. Thus, there is a problem that an increase in the number of pixels inevitably brings about longer generation time, so that it takes considerable time to generate the synthetic range image.

In the method of adjusting light amount disclosed in Japanese Unexamined Patent Application Publication No. 2011-179997, the light emission amount (power consumption) is adjusted to a minimum level necessary for measuring the distance to the subject based on the distribution characteristics of distance values of the obtained range image. This makes it difficult to obtain a highly accurate distance information. In addition, when a plurality of subjects are present at different distances (depths), since the light emission amount is set to a minimum level, the distance information for all the subjects cannot be obtained.

With the foregoing in mind, the present disclosure controls emission of signal light and exposure of reflection light according to a position of a subject and, obtains highly accurate distance information in a short time. In other words, the present disclosure relates to a range image for one or more subjects, and provides range imaging with high accuracy.

In order to achieve the above, a range imaging apparatus according to one aspect of the present disclosure includes a light illuminator that emits signal light from a light source toward a subject; a light receiver that receives reflection light to obtain a signal amount, the reflection light resulting from reflection of the signal light emitted by the light illuminator off the subject; a range image generator that calculates a distance value to the subject based on a time difference between illumination start time and light reception start time, and generates a range image; a distance value distribution analyzer that analyzes a distribution characteristic of the distance value calculated by the range image generator; an illumination controller that adjusts output of the signal light emitted by the light illuminator; an exposure controller that adjusts light reception by the light receiver; and a signal adjuster that calculates an adjustment value for the output and the light reception based on the distribution characteristic, and controls the illumination controller and the exposure controller. The signal amount includes a plurality of signal amounts, the light illuminator emits the signal light toward the subject, the light receiver obtains the plurality of signal amounts at different timings, and the range image generator calculates the distance value to the subject based on a ratio between the plurality of signal amounts. The signal light emitted to generate the range image of the subject includes first signal light and second signal light, the first signal light being for calculating the adjustment value for output and light reception of the second signal light, and the second signal light being for generating the range image. The signal adjuster controls at least one of the illumination controller and the exposure controller for the second signal light based on the distribution characteristic obtained through emission and light reception of the first signal light.

For example, the signal adjuster may control the illumination controller and the exposure controller by adjusting as the adjustment value at least one of illumination intensity, an illumination period, an illumination count, an exposure-free period, exposure start time, an exposure period, and an exposure count of the second signal light based on the distribution characteristic of the distance value obtained through the emission and the light reception of the first signal light.

According to the present disclosure, it becomes possible to provide range imaging for one or more subjects with high accuracy.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 7A is an exemplary timing chart of a TOF system when signal amounts S1, S0, and BG are obtained in the stated order and each signal amount is obtained N times (N is a natural number);

DETAILED DESCRIPTION OF THE EMBODIMENTS

The following is a detailed description of embodiments of the present disclosure, with reference to accompanying drawings. It should be noted that the present disclosure is not limited to the following description and that any person skilled in the art should readily appreciate the possibility of modifying the form and details thereof in various ways without departing from the essence and scope of the present disclosure. Thus, the present disclosure should not be interpreted as limited to the following embodiments. In the configuration of the present disclosure below, the same portions or the portions having similar functions appearing in different figures are assigned the same reference signs, and the descriptions thereof will not be repeated.

Embodiment 1

Figure 1:
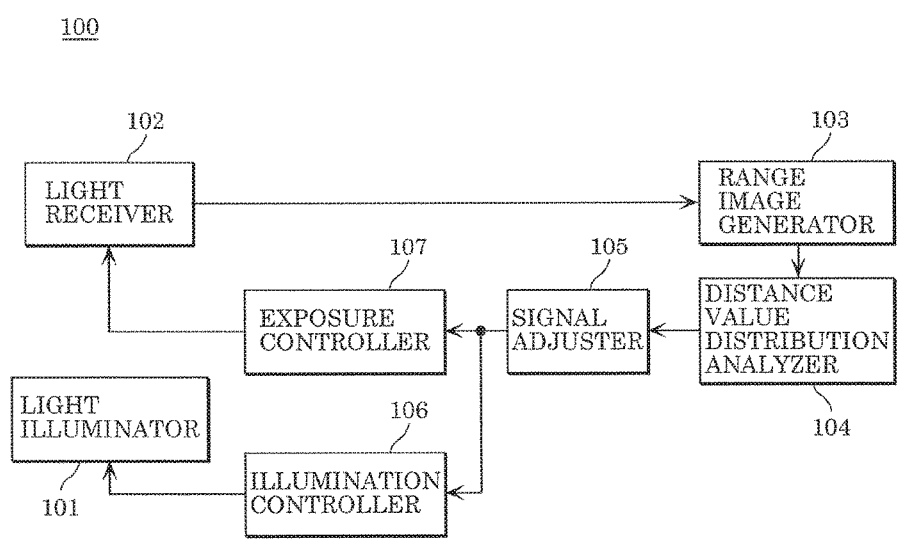
FIG. 1 is a block diagram illustrating a configuration of a range imaging apparatus according to Embodiment 1 and Embodiment 2 of the present disclosure.

FIG. 1 is a block diagram illustrating a schematic configuration of range imaging apparatus 100 according to one embodiment of the present disclosure. Range imaging apparatus 100 illustrated in FIG. 1 is a range imaging apparatus of a TOF system, and includes light illuminator 101 that emits signal light toward a subject and calculates a signal amount, light receiver 102 that receives reflection light, which is light resulting from reflection of the signal light off the subject, range image generator 103 that calculates the distance from range imaging apparatus 100 to the subject based on time difference between the emitted light and the reflection light and generates a range image whose pixels each have the calculated distance as a distance value, distance value distribution analyzer 104 that analyzes distribution characteristics of the distance values, signal adjuster 105 that determines an adjustment value of light emission and exposure, illumination controller 106 that adjusts the light emission, and exposure controller 107 that adjusts the exposure. The signal adjuster controls at least one of illumination controller 106 and exposure controller 107 based on the distribution characteristics obtained through emission and reception of the signal light.

Light that is emitted by light illuminator 101 can include infrared light, a laser beam and so on. An image sensor used in light receiver 102 can include a charge coupled device (CCD) sensor, a complementary metal-oxide semiconductor (CMOS) sensor and so on.

How to determine the adjustment value can include a method of determining the adjustment value based on a maximum value, an average value, threshold setting, and a local maximum value, etc. of the signal amount indicated by the distribution characteristics analyzed by distance value distribution analyzer 104, and a method of providing a signal amount adjustment table in signal adjuster 105 and determining the adjustment value in correspondence with the result of distribution characteristics.

Examples of a parameter for adjusting illumination controller 106 can include intensity, light emission period and illumination count of signal light for illumination. Examples of a parameter for adjusting exposure controller 107 can include exposure period, exposure timing and so on. Furthermore, examples of a method for adjusting a parameter can include changing a shutter speed of an image sensor, using a diaphragm mechanism, and using a filter capable of changing light transmittance.

The present disclosure is characterized by calculating a distance value to the subject in the TOF system, and adjusting signal light based on the distribution characteristics of the calculated distance value. For convenience of description, two kinds of signal light, namely, first signal light and second signal light will be used below. The first signal light is signal light used for adjusting light emission and exposure of the second signal light, and the second signal light is signal light used for generating a highly accurate range image corresponding to the position and number of the subject.

First, how to measure the distance to the subject in the TOF system will be described. In the TOF system, when light illuminator 101 emits light (illumination light) toward the subject and light reflecting off the subject (reflection light) reaches light receiver 102, a time period from when the illumination light reaches and then reflects off the subject to when the reflection light reaches light receiver 102 is detected, thus calculating (measuring) the distance from range imaging apparatus 100 to the subject. Distance L from range imaging apparatus 100 to the subject is expressed by $L=(c \times \Delta T)/2$, where c indicates the speed of light (about $3.0 \times 10^8$ m/s) and $\Delta T$ indicates a time period from when light illuminator 101 emits the signal light to when the reflection light reaches light receiver 102.

Figure 2:
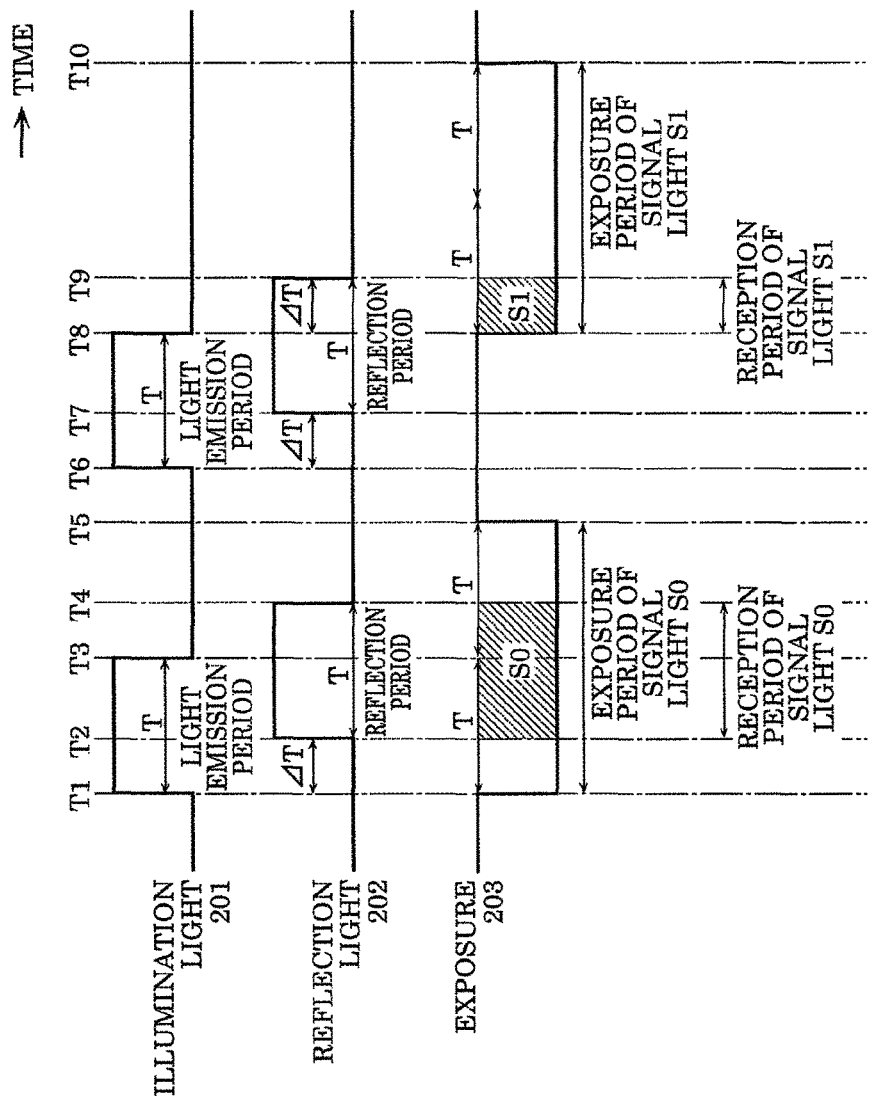
FIG. 2 is an exemplary timing chart of a TOF system when signal amounts S0 and S1 are obtained in the stated order and each signal amount is obtained once.

A specific driving method to which the present disclosure is to be applied will be described with reference to a timing chart in FIG. 2. FIG. 2 is an exemplary timing chart of illumination light 201, reflection light 202 and exposure 203.

As illustrated in the timing chart of illumination light 201, time T1 indicates a first illumination start time, time T3 indicates a first illumination end time, and a period from time T1 to time T3 indicates a first light emission period. Time T6 indicates a second illumination start time, time T8 indicates a second illumination end time, and a period from time T6 to time T8 indicates a second light emission period. Although the first light emission period and the second light emission period are equal in length, namely, time period T in this chart, there is no particular limitation to this.

As illustrated in the timing chart of reflection light 202, time T2 indicates a first reflection start time, time T4 indicates a first reflection end time, and a period from time T2 to time T4 indicates a first reflection period. Time T7 indicates a second reflection start time, time T9 indicates a second reflection end time, and a period from time T7 to time T9 indicates a second reflection period. Although the light emission period and the reflection period are equal in length, namely, time period T in this chart, there is no particular limitation to this.

As illustrated in the timing chart of exposure 203, time T1 indicates a first exposure start time, time T5 indicates a first exposure end time, and a period from time T1 to time T5 indicates a first exposure period (a time period during which the light receiver is exposed to the entire reflection light amount). Time T8 indicates a second exposure start time, time T10 indicates a second exposure end time, and a period from time T8 to time T10 indicates a second exposure period (a time period during which the light receiver is exposed to the delayed reflection light amount). The first exposure period and the second exposure period are equal in length, and the exposure period is 2T, which is twice as long as the light emission period T. However, there is no particular limitation to this.

Furthermore, as illustrated in the timing chart of exposure 203, a period from time T2 to time T4 indicates a first reflection light reception period, and the signal amount obtained during this period (the signal amount obtained during the time period for the exposure to the entire reflection light amount) is referred to as "signal amount S0". In addition, a period from time T8 to time T9 indicates a second reflection light reception period, and the signal amount obtained during this period (the signal amount obtained during the time period for the exposure to the delayed reflection light amount) is referred to as "signal amount S1".

Herein, the exposure indicates that the light receiver accumulates all of the reflection light resulting from signal light emitted toward and reflecting off the subject that is present within a target distance range. The reception indicates that the light receiver accumulates the reflection light resulting from the signal light emitted toward and reflecting off the subject that is present at a certain distance within the target distance range.

In this chart, the first exposure start time is at the same timing as the first illumination start time, and the second exposure start time is at the same timing as the second illumination end time. However, there is no particular limitation to this.

In the following, the method for calculating distance L to the subject using signal amount S0 obtained by the first illumination, reflection and exposure and signal amount S1 obtained by the second illumination, reflection and exposure as above will be explained with reference to calculation formulae.

When T indicates the illumination period (light emission period), $\Delta T$ indicates a period from when signal light is emitted toward, reaches and reflects off the subject to when the signal light is received, c indicates the speed of light, and K indicates a constant of proportionality of the signal light, distance L from a light source to the subject can be expressed by formula 5, which is derived from formulae 1 to 4.

[Formula 1]
$$S0 = K \times T \tag{1}$$

[Formula 2]
$$S1 = K \times \Delta T \tag{2}$$

[Formula 3]
$$L = c \times \frac{\Delta T}{2} \tag{3}$$

[Formula 4]
$$L = \frac{c \times T}{2} \times \frac{\Delta T}{T} \tag{4}$$

[Formula 5]
$$L = \frac{c \times T}{2} \times \frac{S1}{S0} \tag{5}$$

Figure 3:
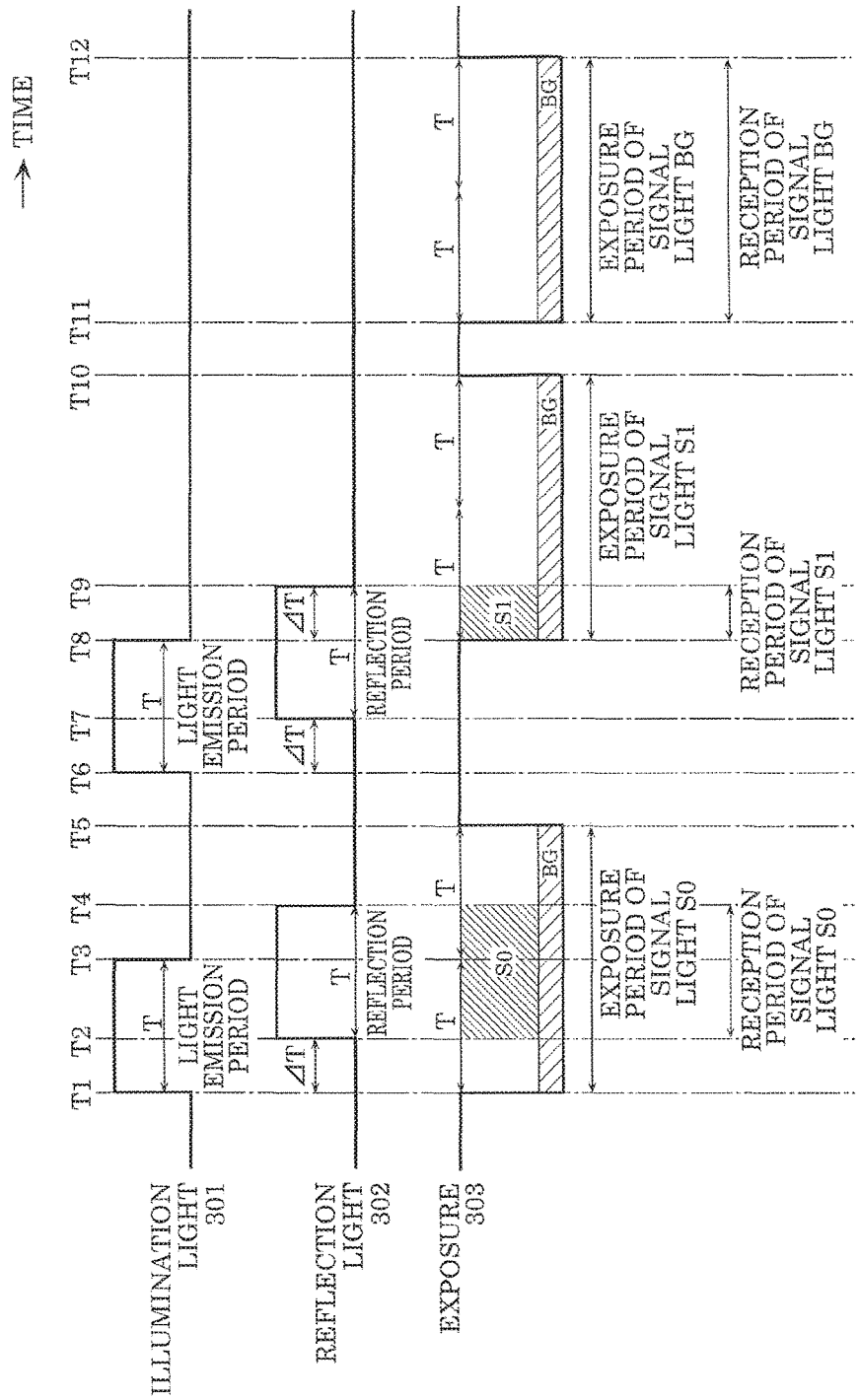
FIG. 3 is an exemplary timing chart of a TOF system when signal amounts S0, S1, and BG are obtained in the stated order and each signal amount is obtained once.

FIG. 3 is an exemplary timing chart of illumination light 301, reflection light 302 and exposure 303. Irrespective of the illumination light, signal amount S0 and signal amount S1 also include a signal amount generated from ambient light. Thus, it may be possible to obtain signal amount BG of non-illumination period (a period from time T11 to time T12) as illustrated in the timing chart of FIG. 3, and subtract signal amount BG from signal amount S0 and signal amount S1, thereby calculating distance L to the subject as shown in formula 6.

[Formula 6]
$$L = \frac{c \times T}{2} \times \frac{S1 - BG}{S0 - BG} \tag{6}$$

Figure 4:
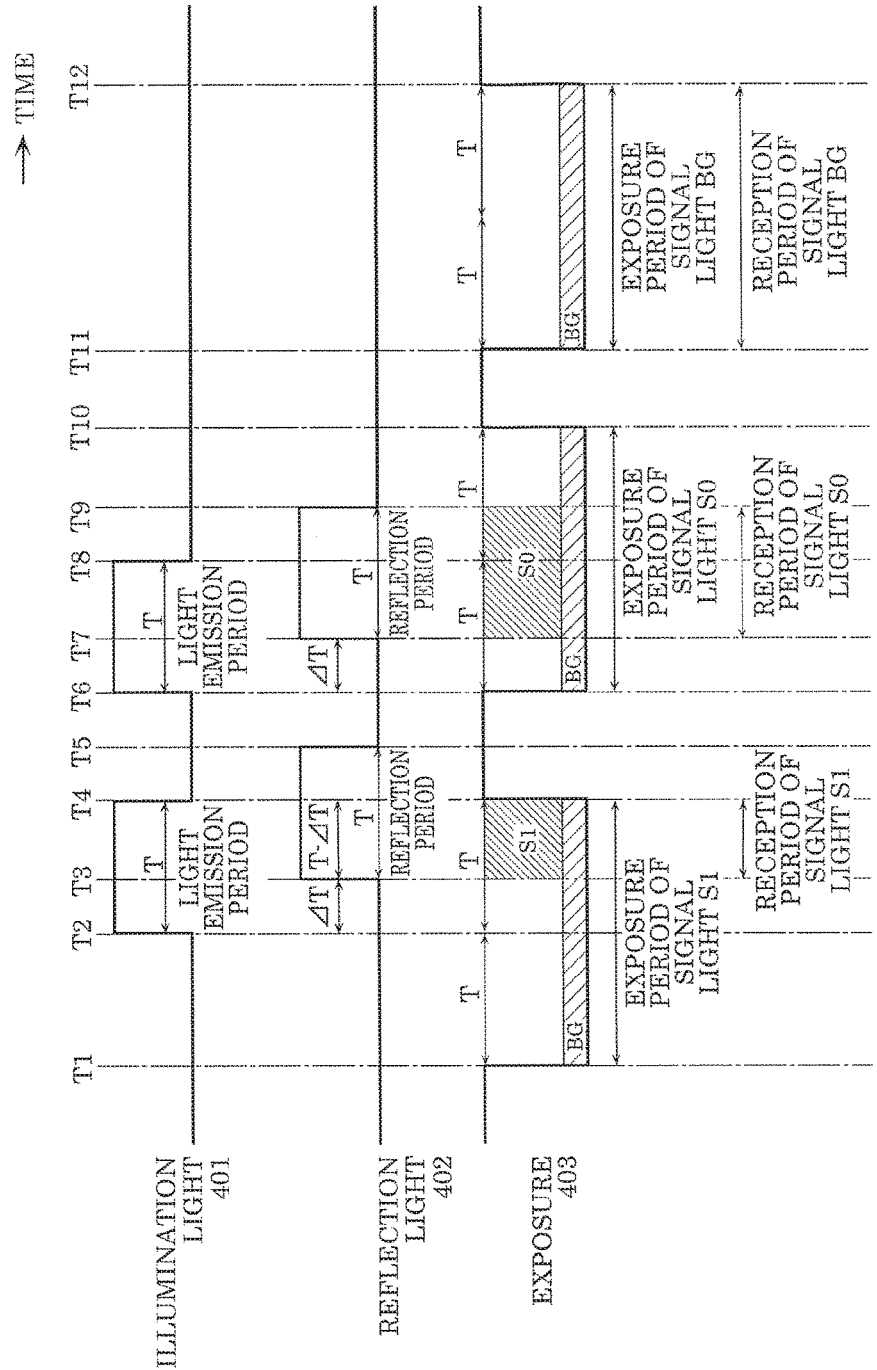
FIG. 4 is an exemplary timing chart of a TOF system when signal amounts S1, S0, and BG are obtained in the stated order and each signal amount is obtained once.

FIG. 4 is an exemplary timing chart of illumination light 401, reflection light 402 and exposure 403. It may be possible to set the exposure start time of signal amount S1 earlier than the first illumination start time as illustrated in the timing chart of FIG. 4, and when obtaining the signal light, calculate distance L to the subject by the calculation formula shown in formula 12, which is derived from formulae 7 to 11. The calculation formula at the time of considering the signal amount generated from ambient light is shown by formula 13.

[Formula 7]
$$S0 = K \times T \tag{7}$$

[Formula 8]
$$S1 = K \times (T - \Delta T) \tag{8}$$

[Formula 9]
$$L = c \times \frac{\Delta T}{2} \tag{9}$$

[Formula 10]
$$L = \frac{c \times T}{2} \times \frac{T - T + \Delta T}{T} \tag{10}$$

[Formula 11]
$$L = \frac{c \times T}{2} \times \left(1 - \frac{T - \Delta T}{T}\right) \tag{11}$$

[Formula 12]
$$L = \frac{c \times T}{2} \times \left(1 - \frac{S1}{S0}\right) \tag{12}$$

[Formula 13]
$$L = \frac{c \times T}{2} \times \left(1 - \frac{S1 - BG}{S0 - BG}\right) \tag{13}$$

In this manner, since light speed c and light emission period T are known, when signal amount S0 and signal amount S1 are obtained, it is possible to calculate distance L to the subject.

Moreover, in the obtaining methods indicated by formulae 5 and 6, it is conceivable to obtain each of signal amounts (S0, S1, and BG) plural times and use a total value thereof.

Figure 5A:
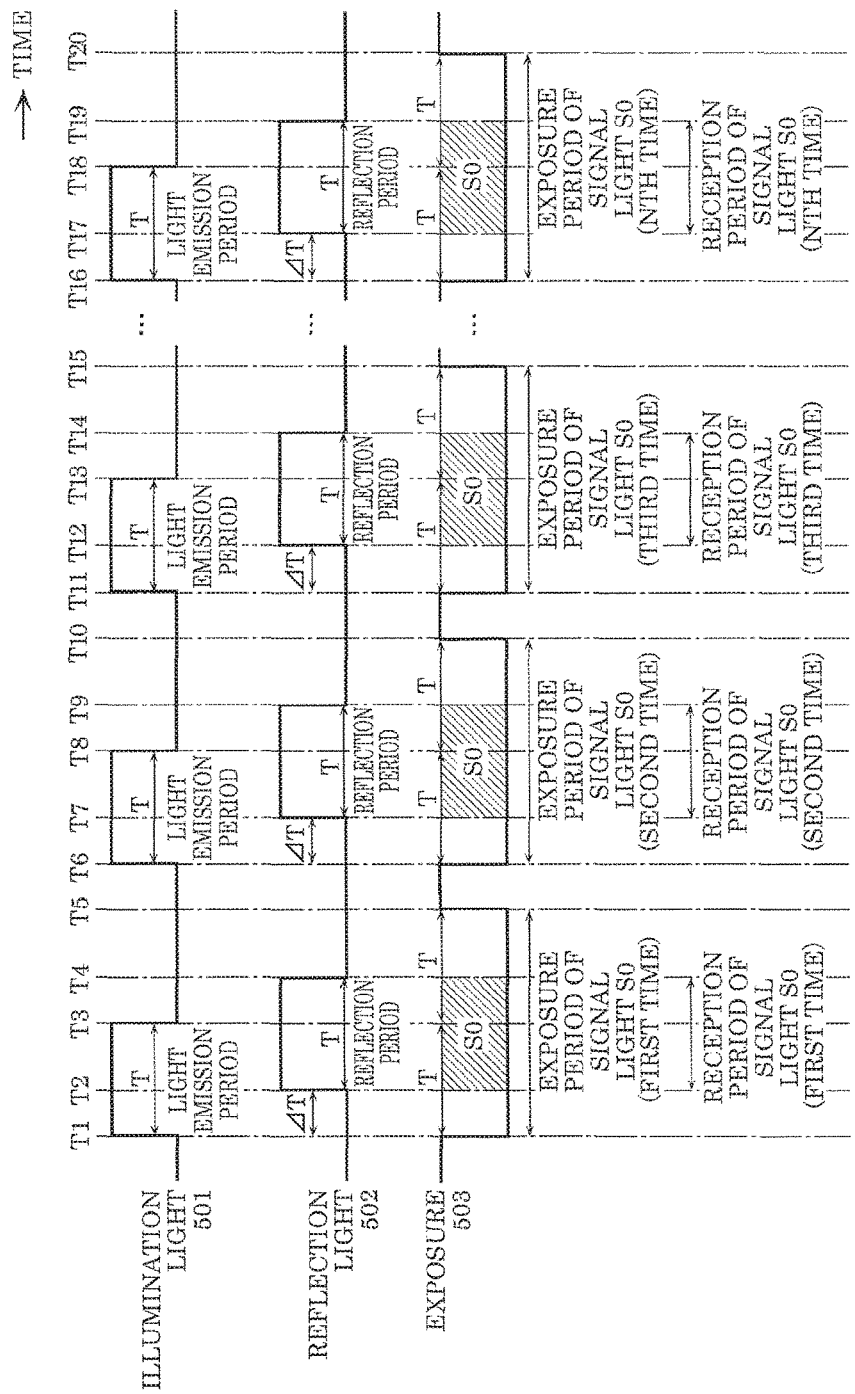
FIG. 5A is an exemplary timing chart of a TOF system when signal amounts S0 and S1 are obtained in the stated order and each signal amount is obtained N times (N is a natural number)
Figure 5B:
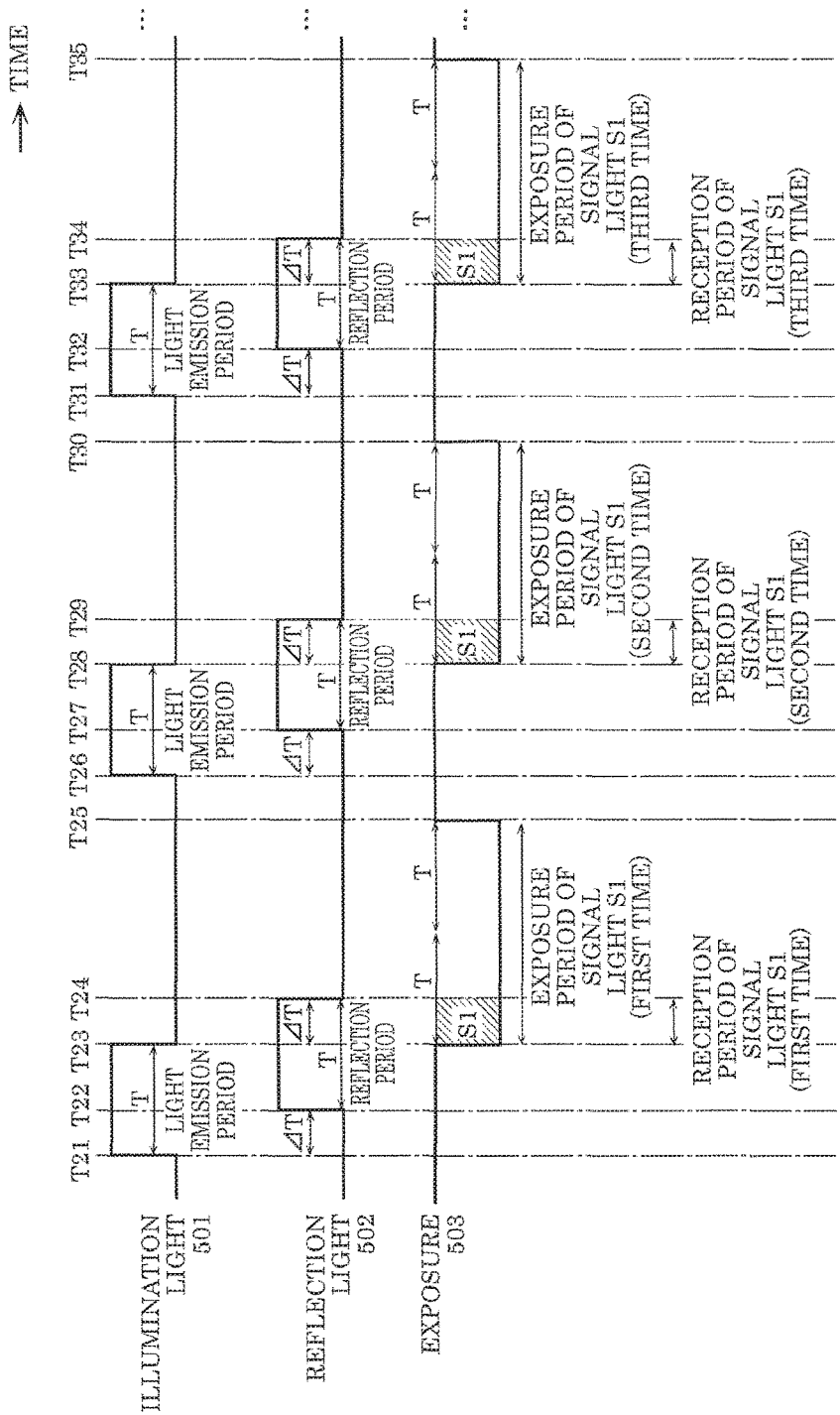
FIG. 5B is a timing chart following FIG. 5A.
Figure 5C:
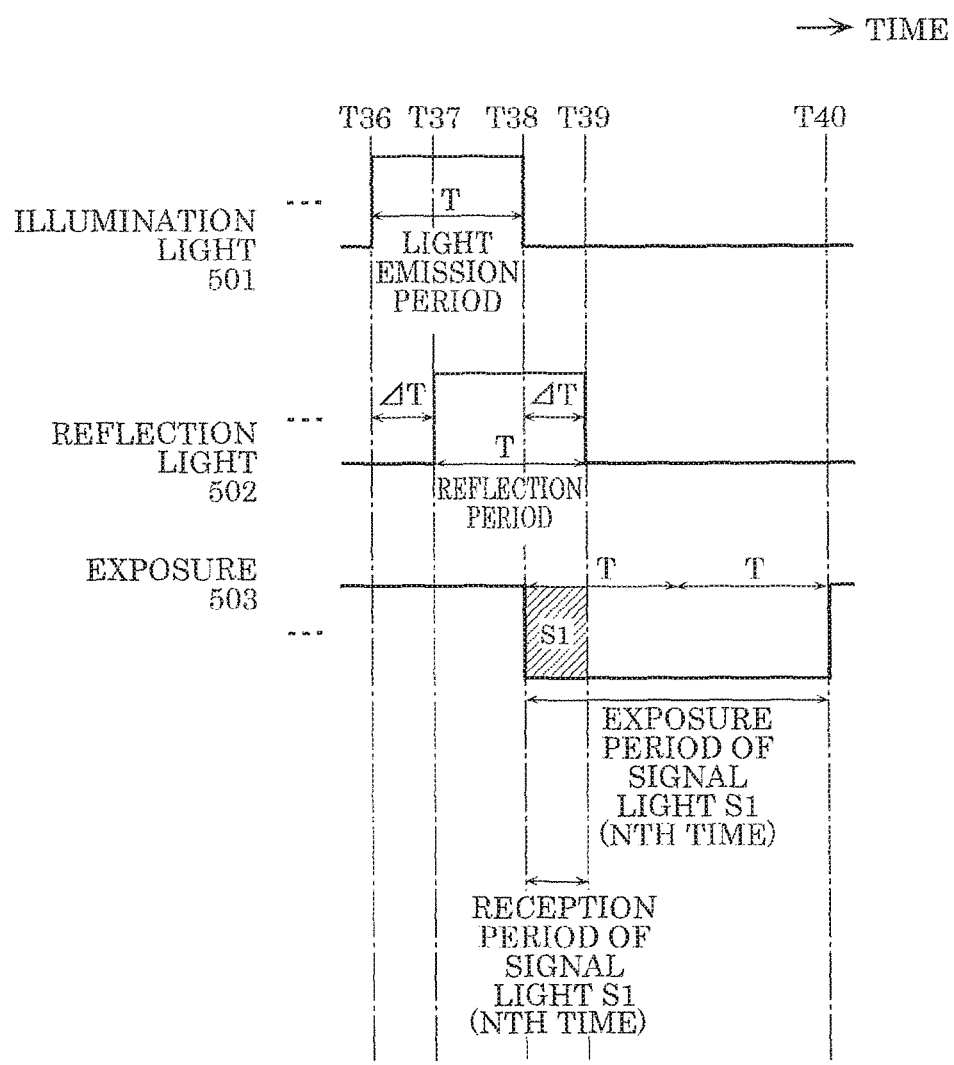
FIG. 5C is a timing chart following FIG. 5B.
Figure 6A:
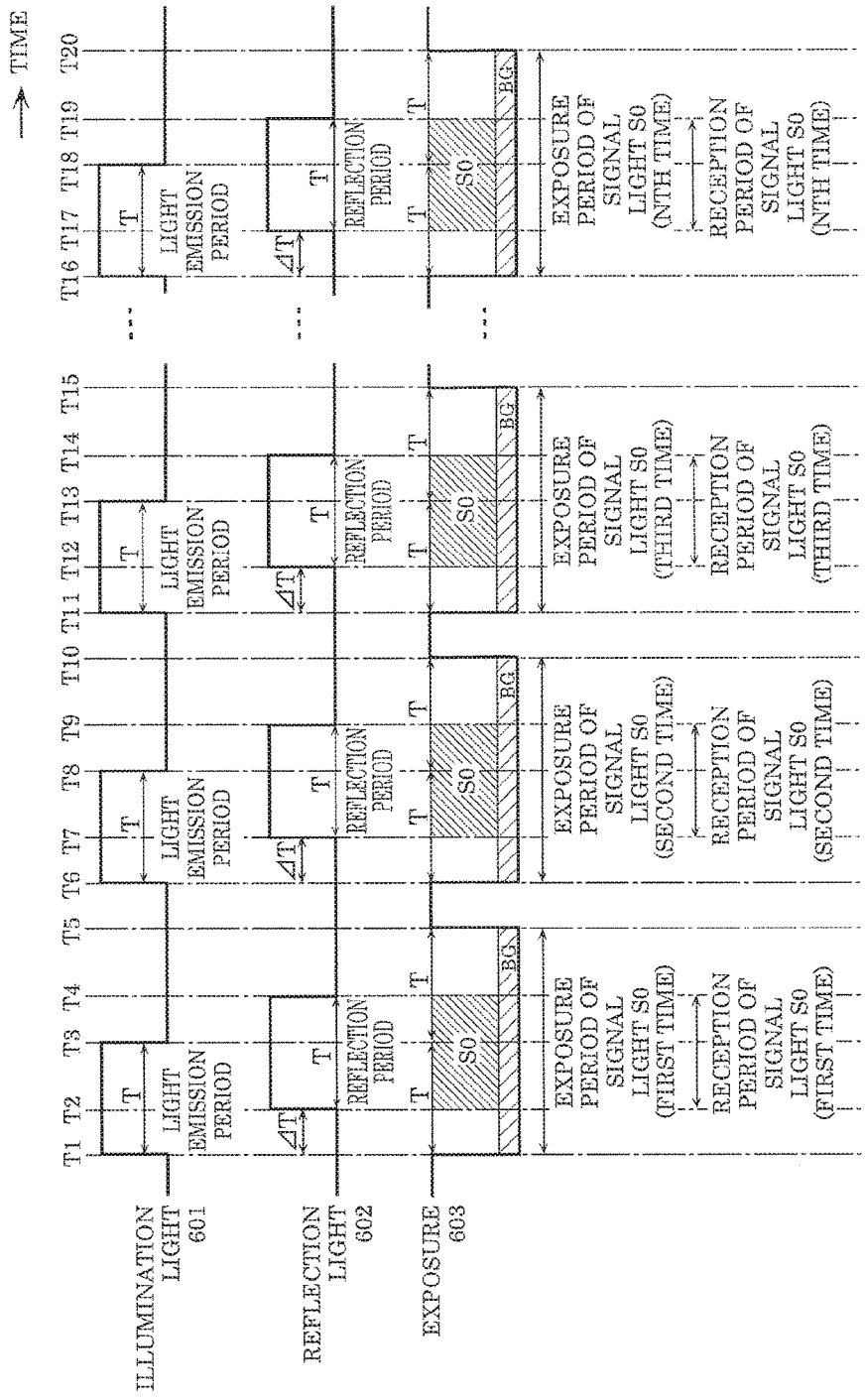
FIG. 6A is an exemplary timing chart of a TOF system when signal amounts S0, S1, and BG are obtained in the stated order and each signal amount is obtained N times (N is a natural number)
Figure 6B:
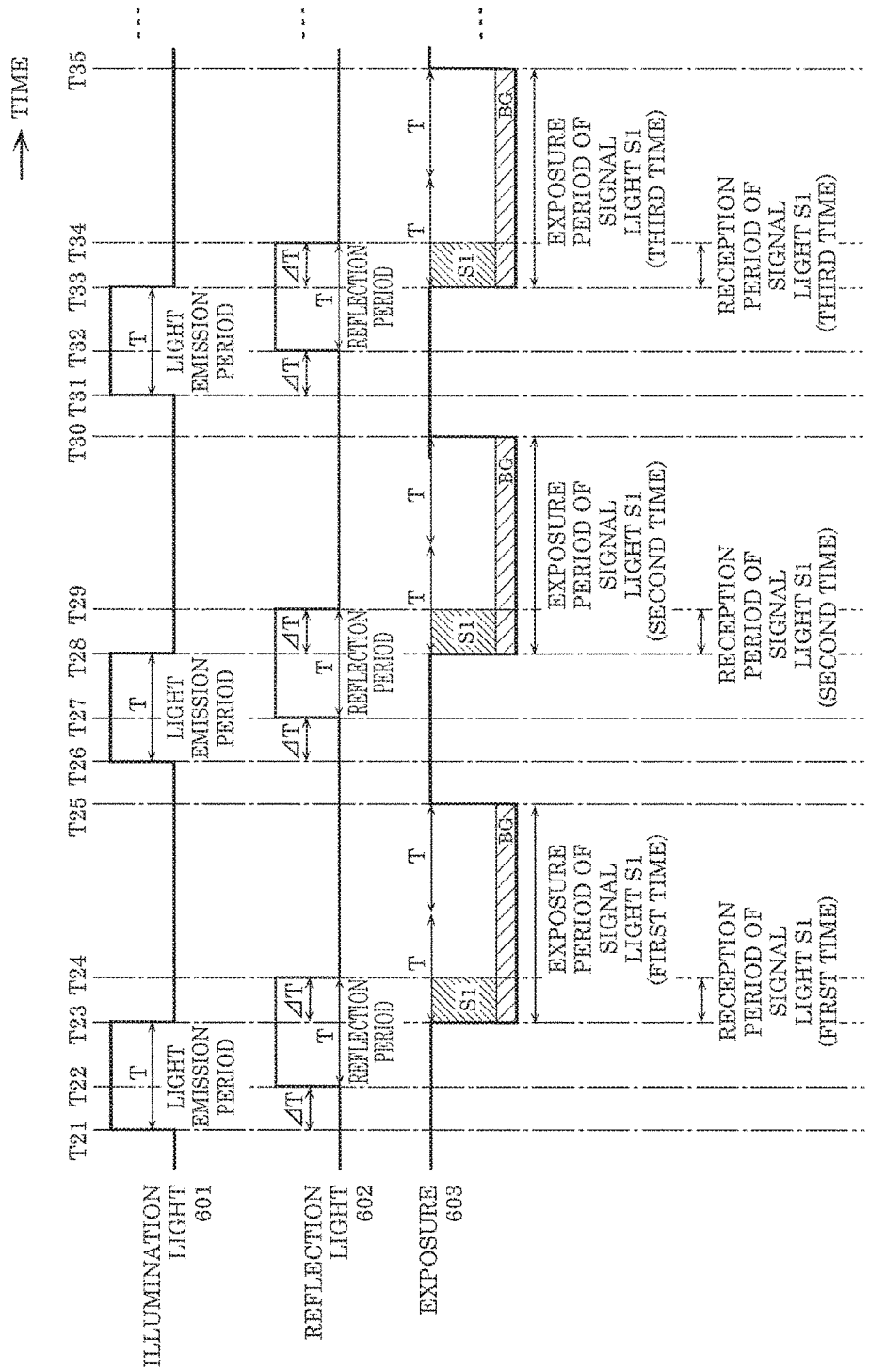
FIG. 6B is a timing chart following FIG. 6A.
Figure 6C:
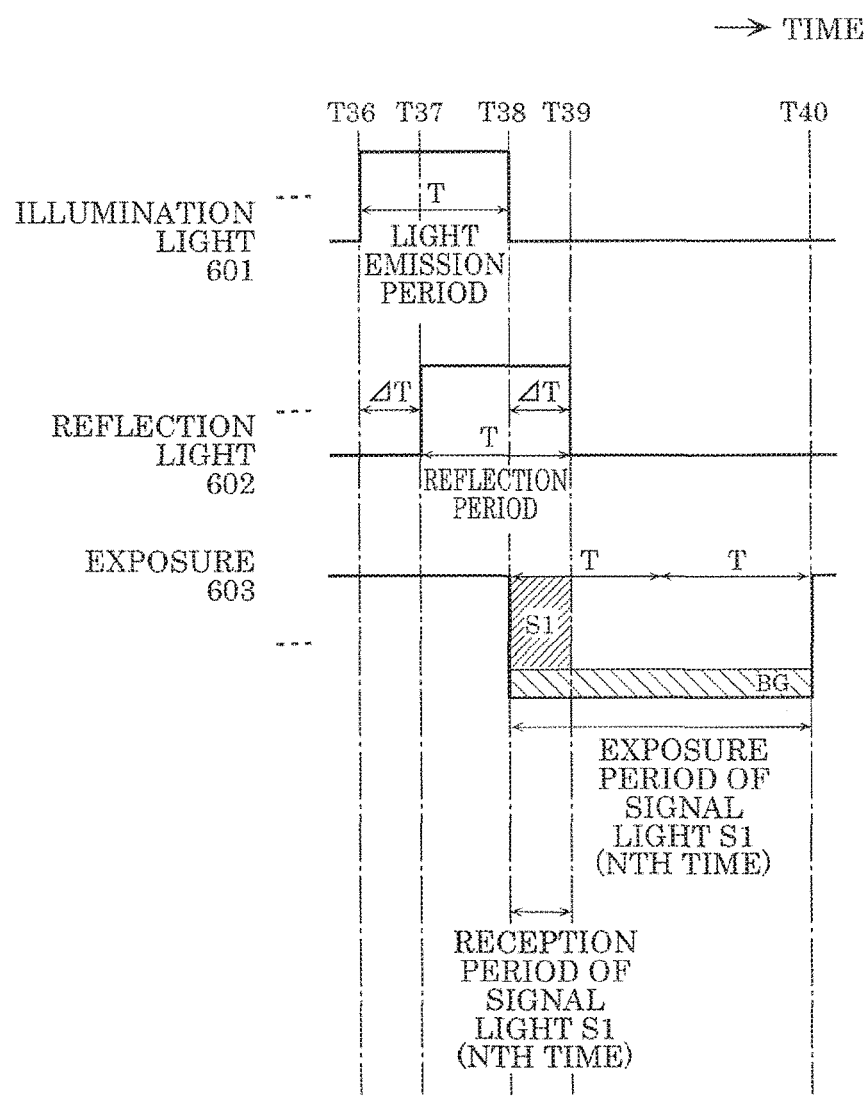
FIG. 6C is a timing chart following FIG. 6B.
Figure 6D:
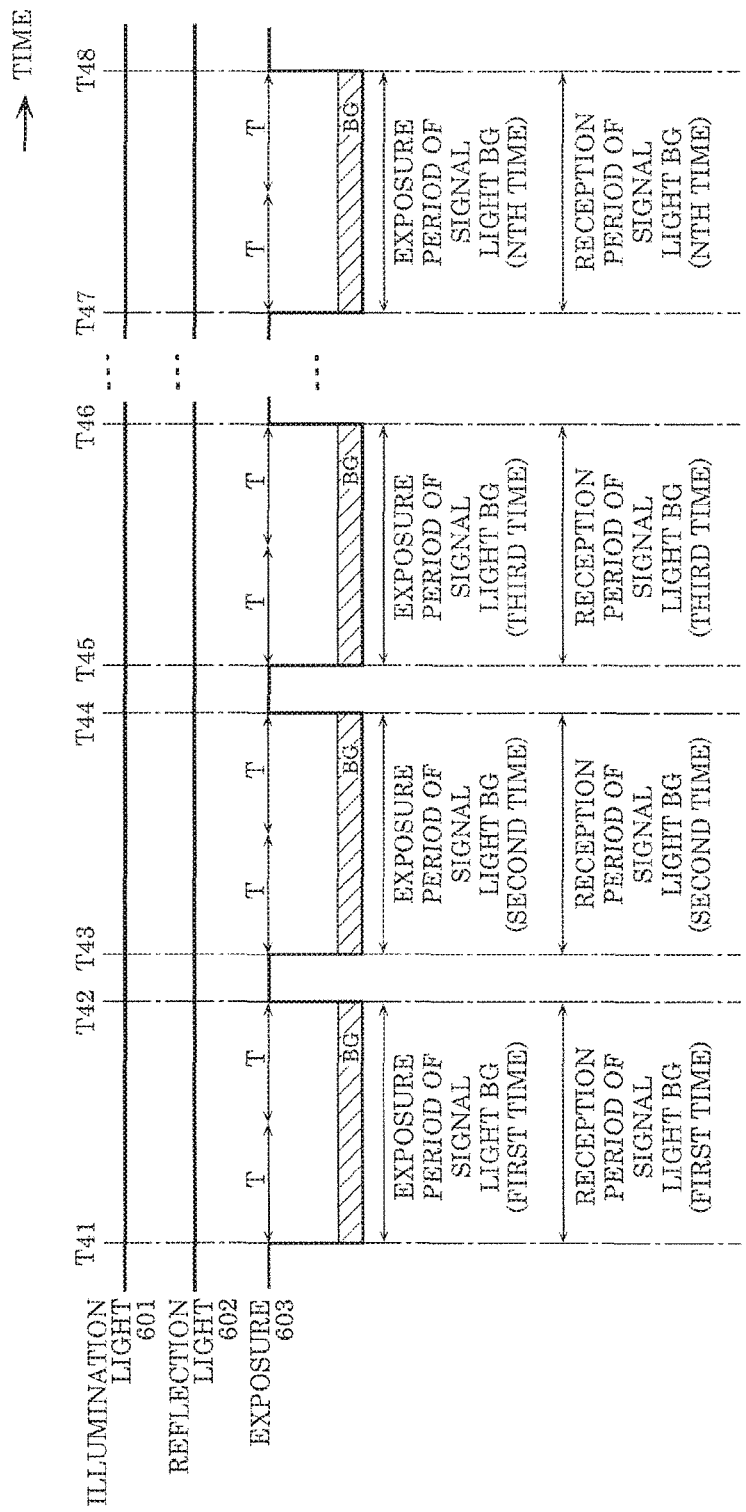
FIG. 6D is a timing chart following FIG. 6C.

With regard to the obtaining method indicated by formula 5, the case of obtaining each signal amount plural times will be explained with reference to the timing charts illustrated in FIG. 5A to FIG. 5C. FIG. 5A to FIG. 5C are exemplary timing charts of illumination light 501, reflection light 502 and exposure 503. FIG. 5A to FIG. 5C illustrate the case of emitting signal light N times (N is a natural number) for obtaining each signal amount. A period from time T1 to time T20 is a reception period of signal amount S0, and a period from time T21 to time T40 is a reception period of signal amount S1. Signal amount S0 used for calculating the distance value is a sum of signal amount S0 obtained from time T2 to time T4, signal amount S0 obtained from time T7 to time T9, signal amount S0 obtained from time T12 to time T14, signal amount S0 obtained from time T17 to time T19, and so on. In other words, it is a sum of signal amounts S0 obtained N times. Signal amount S1 used for calculating the distance value is a sum of signal amount S1 obtained from time T23 to time T24, signal amount S1 obtained from time T28 to time T29, signal amount S1 obtained from time T33 to time T34, signal amount S1 obtained from time T38 to time T39, and so on. In other words, it is a sum of signal amounts S1 obtained N times. Signal amount S0 and signal amount S1 of first signal light (adjustment light) obtained in this manner based on the case illustrated in FIG. 5A to FIG. 5C may be applied to formula 5.

Additionally, timing charts when considering the signal amount generated by ambient light included in signal amount S0 and signal amount S1 will be illustrated in FIG. 6A to FIG. 6D. FIG. 6A to FIG. 6D are exemplary timing charts of illumination light 601, reflection light 602 and exposure 603. FIG. 6A to FIG. 6D illustrate the case of emitting signal light N times (N is a natural number) for obtaining each signal amount. The description from time T1 to time T40 is similar to that of FIG. 5A to FIG. 5C, and thus will be omitted. A period from time T41 to time T48 is a reception period of signal amount BG. Signal amount BG used for calculating the distance value is a sum of signal amount BG obtained from time T41 to time T42, signal amount BG obtained from time T43 to time T44, signal amount BG obtained from time T45 to time T46, signal amount BG obtained from time T47 to time T48, and so on. In other words, it is a sum of signal amounts BG obtained N times. Signal amounts S0, S1, and BG of first signal light (adjustment light) obtained in this manner based on the case illustrated in FIG. 6A to FIG. 6D may be applied to formula 6.

Figure 7B:
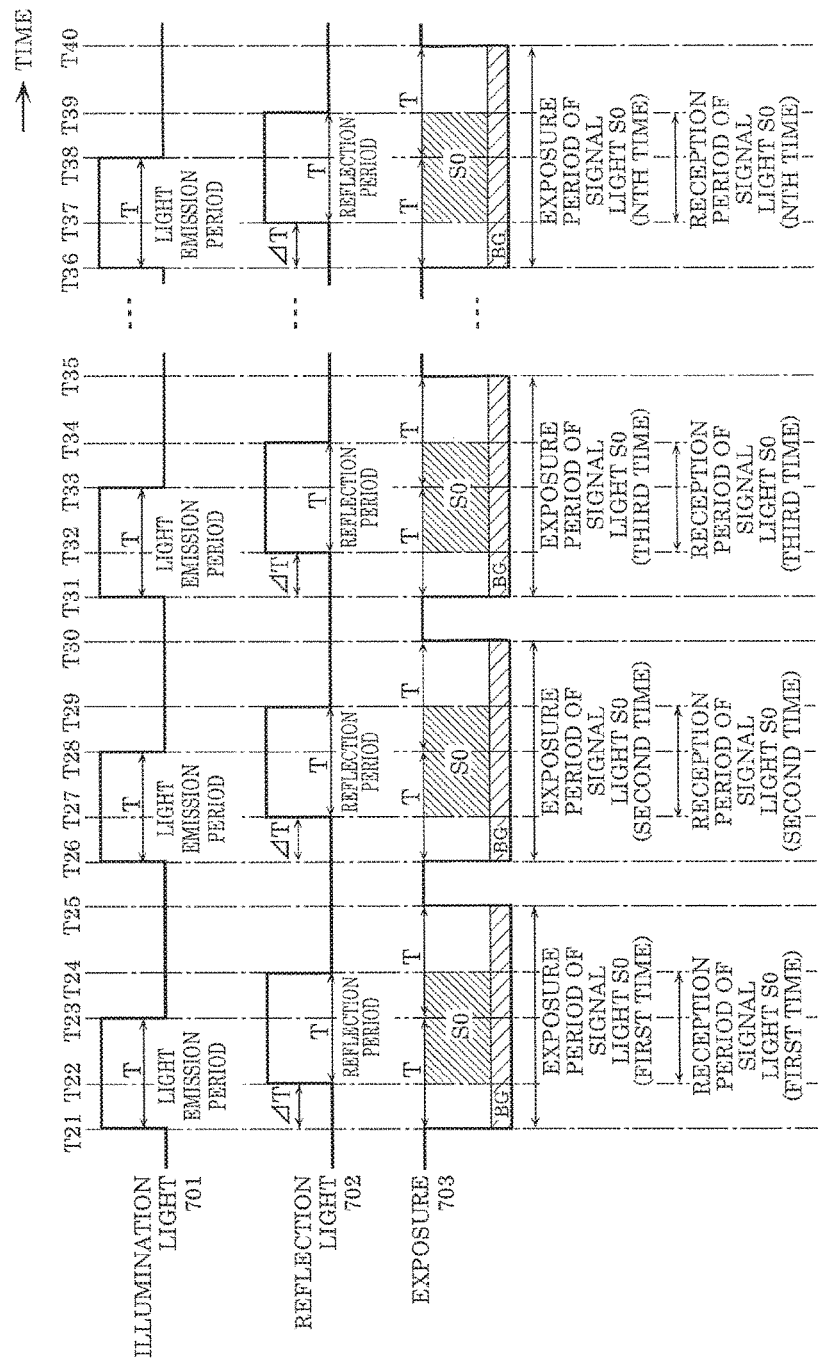
FIG. 7B is a timing chart following FIG. 7A.
Figure 7C:
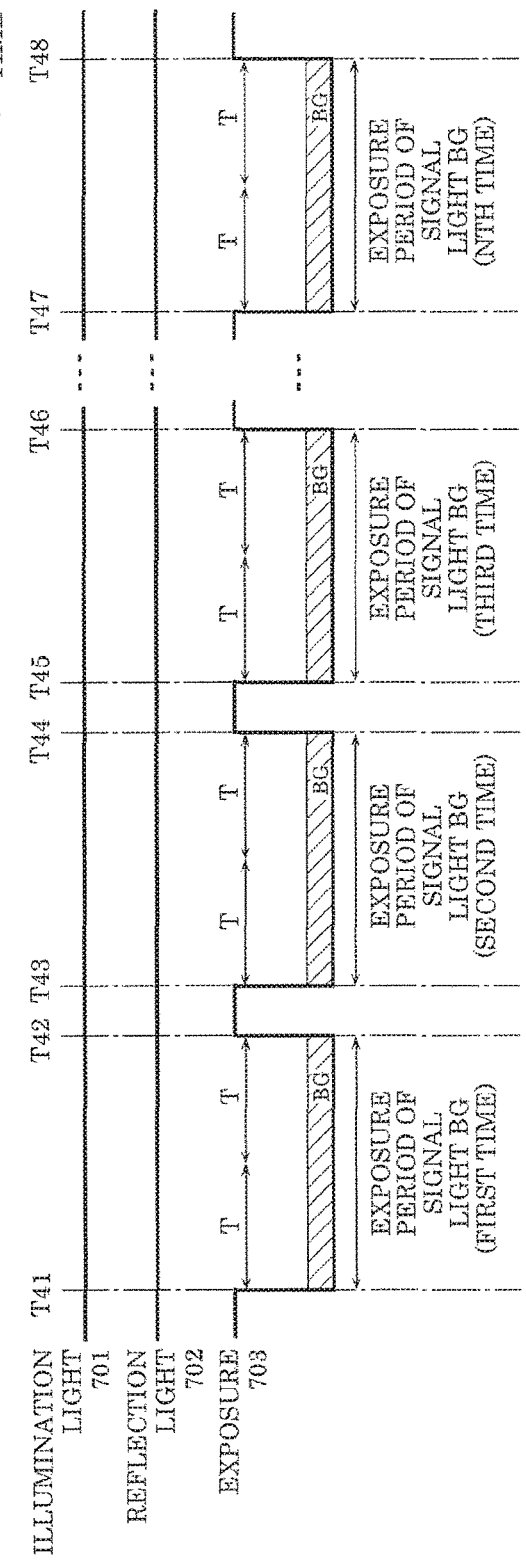
FIG. 7C is a timing chart following FIG. 7B.

Furthermore, it is also conceivable to obtain a signal amount plural times in the case of setting the exposure start time of signal amount S1 earlier than the first illumination start time described with reference to the timing chart of FIG. 4 (see FIG. 7A to FIG. 7C). FIG. 7A to FIG. 7C are exemplary timing charts of illumination light 701, reflection light 702 and exposure 703. Calculation formulae at this time are formulae 12 and 13.

Figure 8:
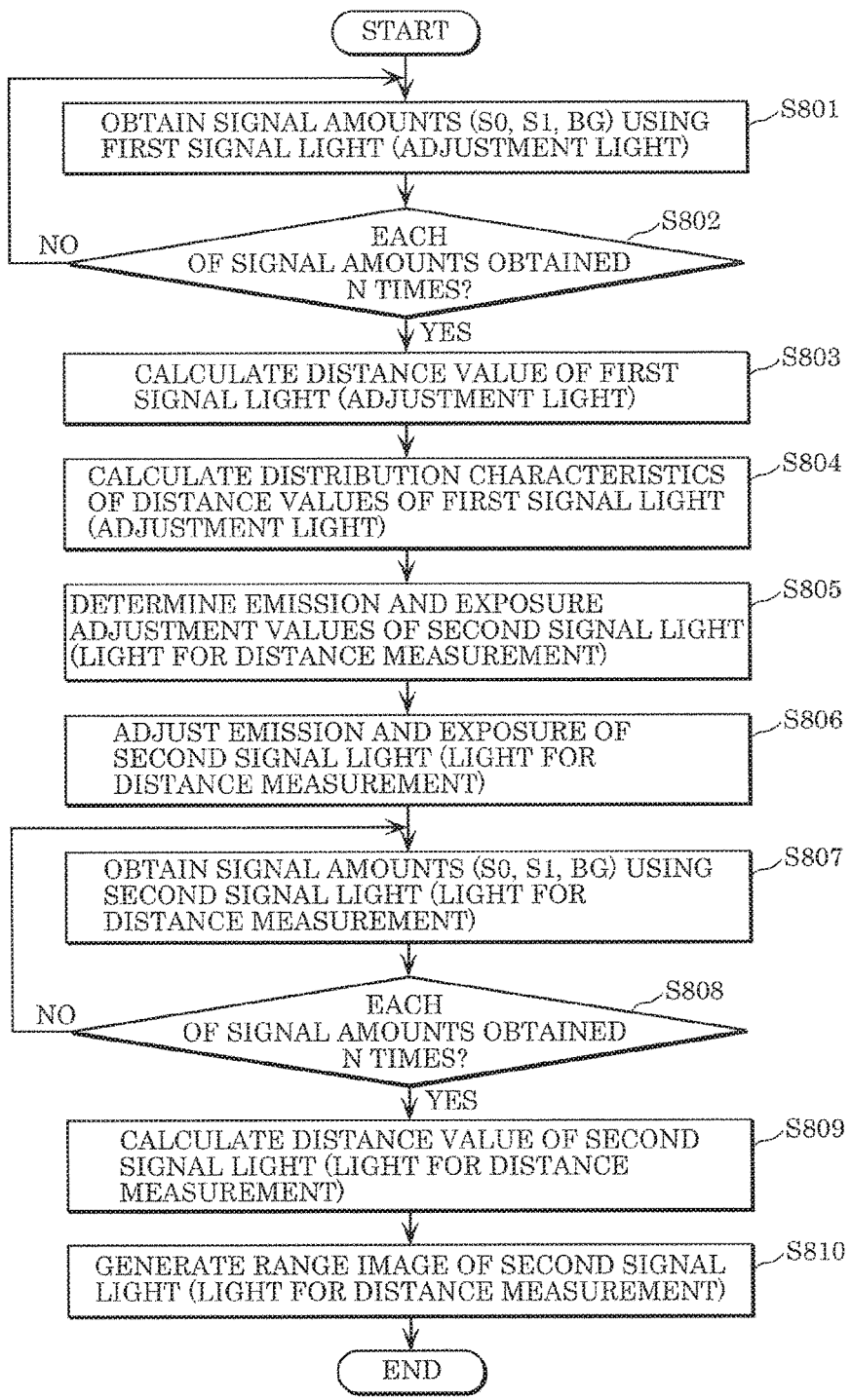
FIG. 8 is a flowchart illustrating a procedure in Embodiment 1 and Embodiment 2 of the present disclosure.
Figure 9:
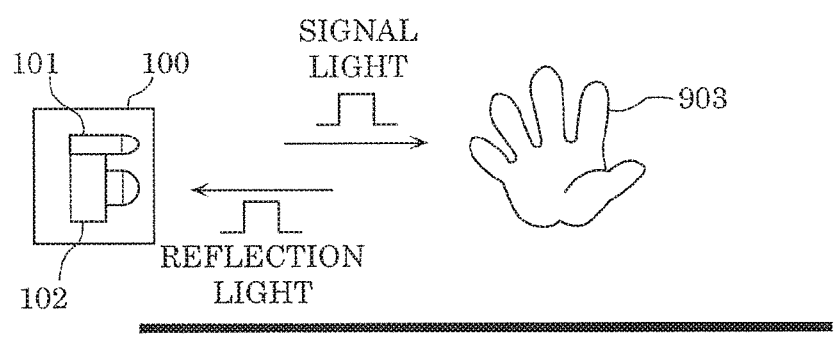
FIG. 9 illustrates an example of measuring the distance to a subject.
Figure 10:
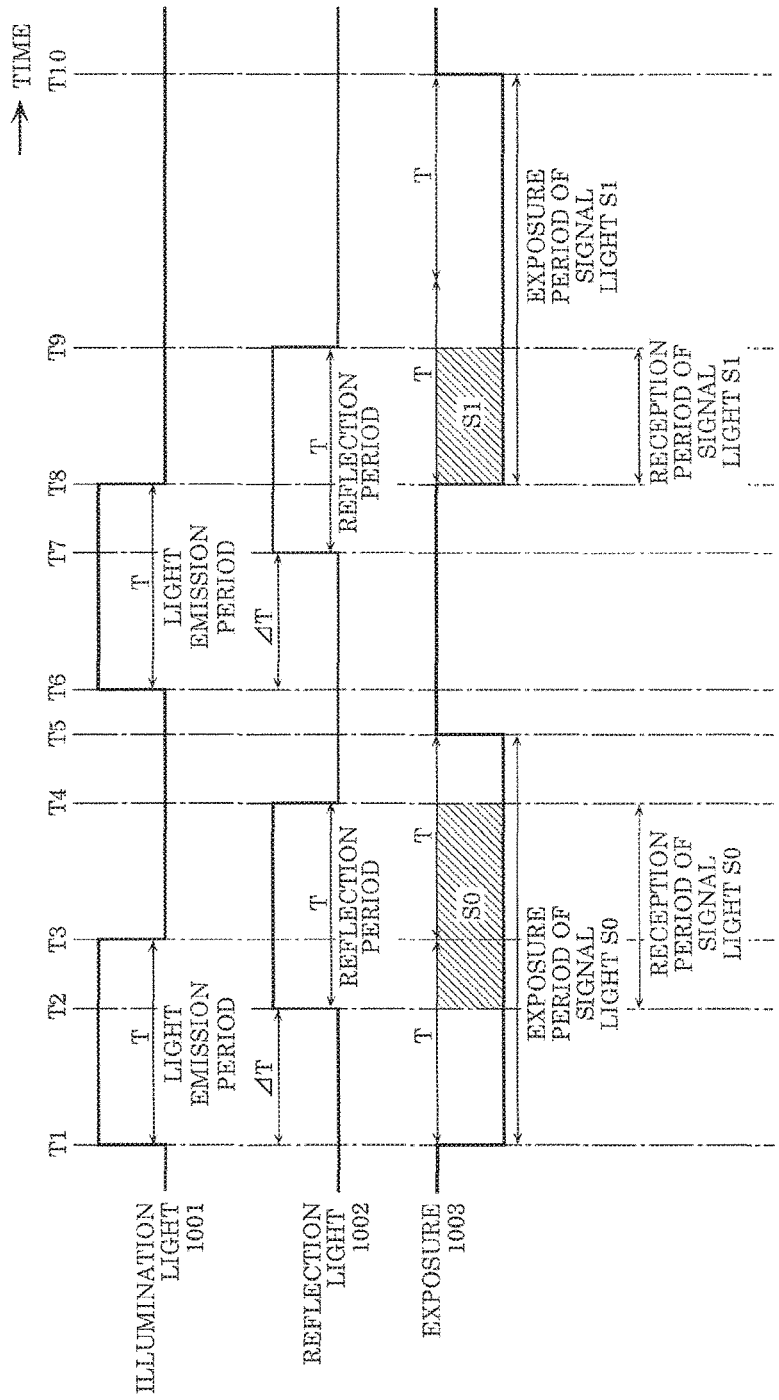
FIG. 10 is an exemplary timing chart for measuring the distance to a subject.
Figure 11:
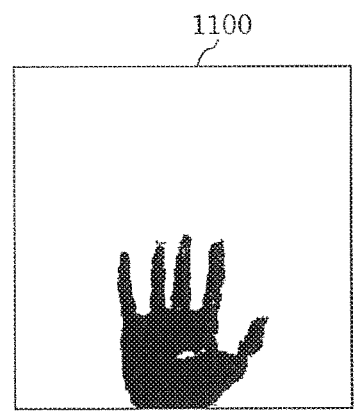
FIG. 11 illustrates an example of a generated range image.

Now, referring to FIG. 8 to FIG. 15, an operation procedure of range imaging apparatus 100 according to Embodiment 1 will be described by way of a specific example in which a range image illustrated in FIG. 11 of subject 903 illustrated in FIG. 9 is generated. FIG. 8 is a flowchart illustrating the operation procedure of range imaging apparatus 100 according to Embodiment 1.

Light illuminator 101 emits the first signal light (adjustment light) toward the subject, and light receiver 102 receives the reflection light resulting from the reflection of the adjustment light off the subject, thus obtaining each of signal amounts (S0, S1, and BG) (S801).

Then, the operation of obtaining each of the signal amounts N times (N is a natural number) is repeated (S802). The timing chart with regard to the emission and reception of signal light and the obtainment of signal amounts is illustrated in FIG. 10. FIG. 10 is an exemplary timing chart of illumination light 1001, reflection light 1002 and exposure 1003. This figure illustrates the operation of N=1 and the case of obtaining signal amount S0 and signal amount S1.

Light receiver 102 includes a plurality of light receiving elements, which can each obtain a signal amount. Accordingly, range image generator 103 calculates distance information (a distance value) based on a plurality of signal amounts that are obtained by light receiver 102 (S803), and further generates range image 1100 configured by a plurality of distance values as illustrated by FIG. 11.

Figure 12A:
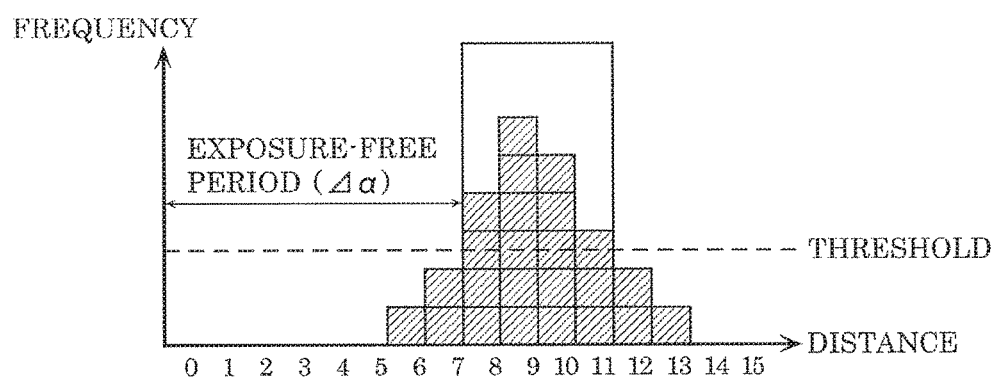
FIG. 12A illustrates an example of distribution characteristics of distance values of a subject.
Figure 12B:
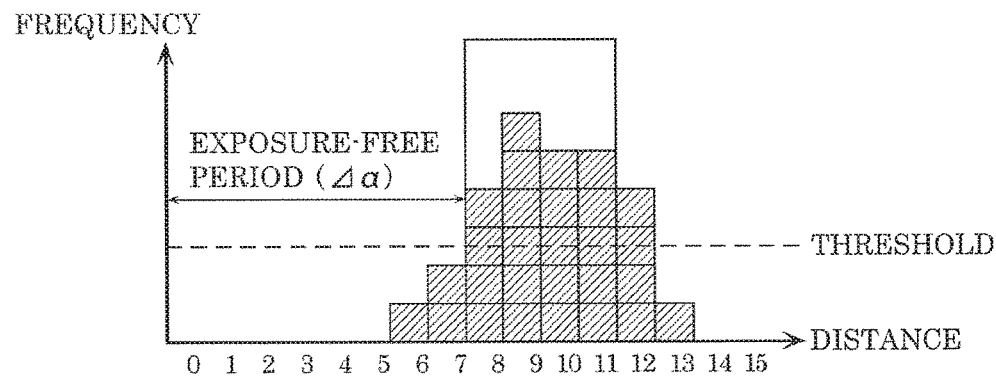
FIG. 12B illustrates an example of distribution characteristics of distance values of a subject.

Distance value distribution analyzer 104 calculates distribution characteristics of the distance values as illustrated by FIG. 12A and FIG. 12B based on the range image generated by range image generator 103, and stores the distribution characteristics therein (S804).

Based on the distribution characteristics of the distance values calculated by distance value distribution analyzer 104, signal adjuster 105 calculates adjustment values of illumination controller 106 and exposure controller 107 (S805). More specifically, signal adjuster 105 calculates a nearest distance (N) based on the result of the distribution characteristics, calculates an exposure-free period ($\Delta\alpha$) based on the nearest distance (N), calculates exposure start time (EXS) based on the exposure-free period ($\Delta\alpha$), and calculates illumination count (EC) and exposure count (EXC) based on the exposure-free period ($\Delta\alpha$).

The method for determining the adjustment values can include a method of determining an adjustment value based on a maximum value, an average value and threshold setting, and a local maximum value, etc., of a signal amount indicated by the distribution characteristics, and a method of providing a signal amount adjustment table in signal adjuster 105 and determining the adjustment value in correspondence with the result of distribution characteristics.

In the following, each of the adjustment values will be described more specifically.

The nearest distance (N) is the nearest depth at which a subject is assumed to be present. The nearest distance (N) varies depending on the distance from an imaging device such as a camera to the subject. In other words, the nearest distance (N) decreases as the subject lies closer to the imaging device.

The exposure-free period ($\Delta\alpha$) is a period during which exposure is not performed in the depth range where no subject is present. The exposure-free period ($\Delta\alpha$) is calculated based on the light speed c and the depth range where no subject is present. For example, when it is determined based on the calculation result of the distribution characteristics that no subject is present in the depth range of 0 m to 1.11 m, the exposure-free period ($\Delta\alpha$) can be calculated to be 7.4 ns from the formula $1.11=(3.0\times108\times\Delta\alpha)/2$, with light speed c being $3.0\times108$ m/s.

The exposure start time (EXS) is time of starting exposure of reflection light, and calculated based on the exposure-free period ($\Delta\alpha$). The exposure start time (EXS) gets later with an increase in the exposure-free period ($\Delta\alpha$), and vice versa.

The illumination count (EC) is the number of times each signal amount is obtained, and calculated based on the exposure-free period ($\Delta\alpha$). The presence of the exposure-free period ($\Delta\alpha$) avoids unnecessary exposure, but reduces the signal amount to be obtained, leading to deterioration of an S/N ratio. Accordingly, by providing the illumination count (EC) to control the number of times each signal amount is obtained, the deterioration of the S/N ratio is prevented.

The exposure count (EXC) is the number of times the reflection light is exposed, and calculated based on the exposure-free period ($\Delta\alpha$). Furthermore, the exposure count (EXC) is twice as large as the illumination count (EC).

In this manner, the exposure-free period ($\Delta\alpha$) and the exposure start time (EXS) are set to receive only the necessary reflection light, thereby improving the resolution of the signal amount. Moreover, by providing the illumination count (EC) and the exposure count (EXC), it is possible to prevent the deterioration of the S/N ratio with a decrease in the signal amount that is obtained.

Based on the adjustment values determined by signal adjuster 105, signal adjuster 105 controls illumination controller 106 and exposure controller 107, thus adjusting the emission and reception of the second signal light (light for distance measurement) (S806). The illumination count (EC) is the adjustment value of illumination controller 106, and the exposure start time (EXS) and the exposure count (EXC) are the adjustment values of exposure controller 107. In addition to the above-noted adjustment values, the illumination intensity (E) may be adjusted to the limit to which the signal amount is saturated.

Next, the distance measurement of a subject using the second signal light (light for distance measurement) will be described.

After the second signal light (light for distance measurement) is adjusted, light illuminator 101 emits the second signal light (light for distance measurement) toward the subject. Similar to the first signal light (adjustment light), light receiver 102 is exposed to reflection light of the second signal light and obtains the signal amount (S807).

Figure 13:
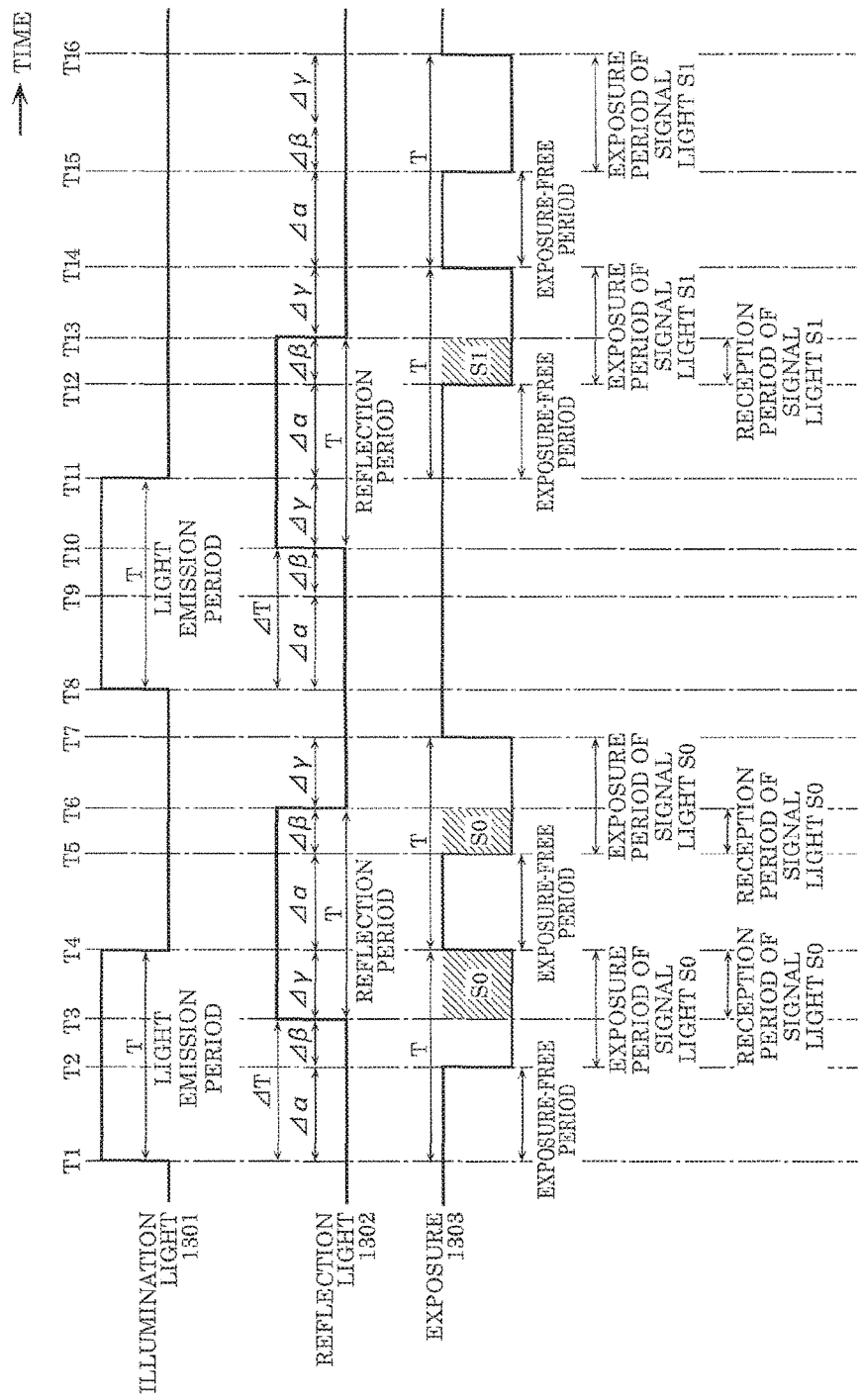
FIG. 13 is an exemplary timing chart when signal amounts S0 and S1 are obtained in the stated order using second signal light (adjustment light) and each signal amount is obtained once in Embodiment 1 of the present disclosure.

With reference to the timing chart in FIG. 13, a specific driving method using the second signal light (light for distance measurement) will be described. FIG. 13 is an exemplary timing chart of illumination light 1301, reflection light 1302 and exposure 1303. Although FIG. 13 represents the case in which it is determined that the illumination count (EC)=1, the same will apply to the case of emitting the signal light N times.

As illustrated in the timing chart of illumination light 1301, time T1 indicates a first illumination start time, time T4 indicates a first illumination end time, and a period from time T1 to time T4 indicates a first light emission period. Time T8 indicates a second illumination start time, time T11 indicates a second illumination end time, and a period from time T8 to time T11 indicates a second light emission period. Although the first light emission period and the second light emission period are equal in length, namely, time period T in this chart, there is no particular limitation to this.

As illustrated in the timing chart of reflection light 1302, time T3 indicates a first reflection start time, time T6 indicates a first reflection end time, and a period from time T3 to time T6 indicates a first reflection period. Time T10 indicates a second reflection start time, time T13 indicates a second reflection end time, and a period from time T10 to time T13 indicates a second reflection period. Although the light emission period and the reflection period are equal in length, namely, time period T in this chart, there is no particular limitation to this.

As illustrated in the timing chart of exposure 1303, time T2 indicates a third exposure start time, time T4 indicates a third exposure end time, and a period from time T2 to time T4 indicates a third exposure period (an exposure period of signal amount S0 for the first time). Time T5 indicates a fourth exposure start time, time T7 indicates a fourth exposure end time, and a period from time T5 to time T7 indicates a fourth exposure period (an exposure period of signal amount S0 for the second time). Time T12 indicates a fifth exposure start time, time T14 indicates a fifth exposure end time, and a period from time T12 to time T14 indicates a fifth exposure period (an exposure period of signal amount S1 for the first time). Time T15 indicates a sixth exposure start time, time T16 indicates a sixth exposure end time, and a period from time T15 to time T16 indicates a sixth exposure period (an exposure period of signal amount S1 for the second time). Although the third exposure period to the sixth exposure period are equal in length, namely, time period T in this chart, there is no particular limitation to this.

Moreover, as illustrated in the timing chart of exposure 1303, a period from time T3 to time T4 indicates a third reflection light reception period, and a period from time T5 to time T6 indicates a fourth reflection light reception period. Now, a sum of the signal amounts obtained in the third reflection light reception period and the fourth reflection light reception period is replaced by S0 in formulae 1 to 13. Furthermore, a period from time T12 to time T13 indicates a fifth reflection light reception period, and a period from time T15 to time T16 indicates a sixth reflection light reception period. Now, a sum of the signal amounts obtained in the fifth reflection light reception period and the sixth reflection light reception period is replaced by S1 in formulae 1 to 13.

The third exposure period and the fourth exposure period correspond to the first exposure period in FIG. 2. The fifth exposure period and the sixth exposure period correspond to the second exposure period in FIG. 2.

Although the period from time T1 to time T2, the period from time T4 to time T5, the period from time T8 to time T9, the period from time T11 to time T12, and the period from time T14 to time T15 are the exposure-free period ($\Delta\alpha$) and equal in length, namely, time period T in this chart, there is no particular limitation to this.

In this chart, the third exposure start time (time T2) is timing at which the exposure-free period ($\Delta\alpha$) has passed since the first illumination start time (time T1), the fourth exposure start time (time T5) is timing at which the exposure-free period ($\Delta\alpha$) has passed since the first illumination end time (time T4), the fifth exposure start time (time T12) is timing at which the exposure-free period ($\Delta\alpha$) has passed since the second illumination end time (time T11), and the sixth exposure start time (time T15) is timing at which the exposure-free period ($\Delta\alpha$) has passed since the fifth exposure end time (time T14). However, there is no particular limitation to these.

The above-described processing is repeated N times (the time set by the illumination count (EC)), thus obtaining each of the signal amounts (S808).

Next, a distance value is calculated based on the obtained signal amounts (S809). With reference to the exemplary timing chart illustrated in FIG. 13, the calculation of the distance value will be described using the formulae. When T indicates the light emission period, c indicates the light speed, $\Delta T$ indicates a period from when signal light is emitted and reaches the subject to when the signal light reflects off the subject and is received by light receiver 102, $\Delta\alpha$ indicates the exposure-free period, $\Delta\beta$ indicates the difference between $\Delta T$ and $\Delta\alpha$ ($\Delta\beta=\Delta T-\Delta\alpha$), and $\Delta\gamma$ indicates the difference between T and $\Delta T$ ($\Delta\gamma=T-\Delta T$), distance L to the subject can be expressed by formula 23, which is derived from formulae 14 to 22.

[Formula 14]
$$S0 = K \times (\Delta\beta \times \Delta\gamma) \tag{14}$$

[Formula 15]
$$S1 = K \times \Delta\beta \tag{15}$$

[Formula 16]
$$L = c \times \frac{\Delta T}{2} \tag{16}$$

[Formula 17]
$$L = \frac{c \times (\Delta\alpha + \Delta\beta)}{2} \quad (\because \Delta T = \Delta\alpha + \Delta\beta) \tag{17}$$

[Formula 18]
$$L = \frac{c \times \Delta\alpha}{2} + \frac{c \times \Delta\beta}{2} \tag{18}$$

[Formula 19]
$$L = \frac{c \times \Delta\alpha}{2} + \frac{c \times \Delta\beta}{2} \times \frac{\Delta\beta + \Delta\gamma}{\Delta\beta + \Delta\gamma} \tag{19}$$

[Formula 20]
$$L = \frac{c \times \Delta\alpha}{2} + \frac{c \times (\Delta\beta + \Delta\gamma)}{2} \times \frac{\Delta\beta}{\Delta\beta + \Delta\gamma} \tag{20}$$

[Formula 21]
$$L = \frac{c \times \Delta\alpha}{2} + \frac{c \times (\Delta\alpha + \Delta\beta + \Delta\gamma - \Delta\alpha)}{2} \times \frac{\Delta\beta}{\Delta\beta + \Delta\gamma} \tag{21}$$

[Formula 22]
$$L = \frac{c \times \Delta\alpha}{2} + \frac{c \times (T - \Delta\alpha)}{2} \times \frac{\Delta\beta}{\Delta\beta + \Delta\gamma} \quad (\because T = \Delta\alpha + \Delta\beta + \Delta\gamma) \tag{22}$$

[Formula 23]

$$L = \frac{c \times \Delta\alpha}{2} + \frac{c \times (T - \Delta\alpha)}{2} \times \frac{S1}{S0} \quad (23)$$

Figure 14:
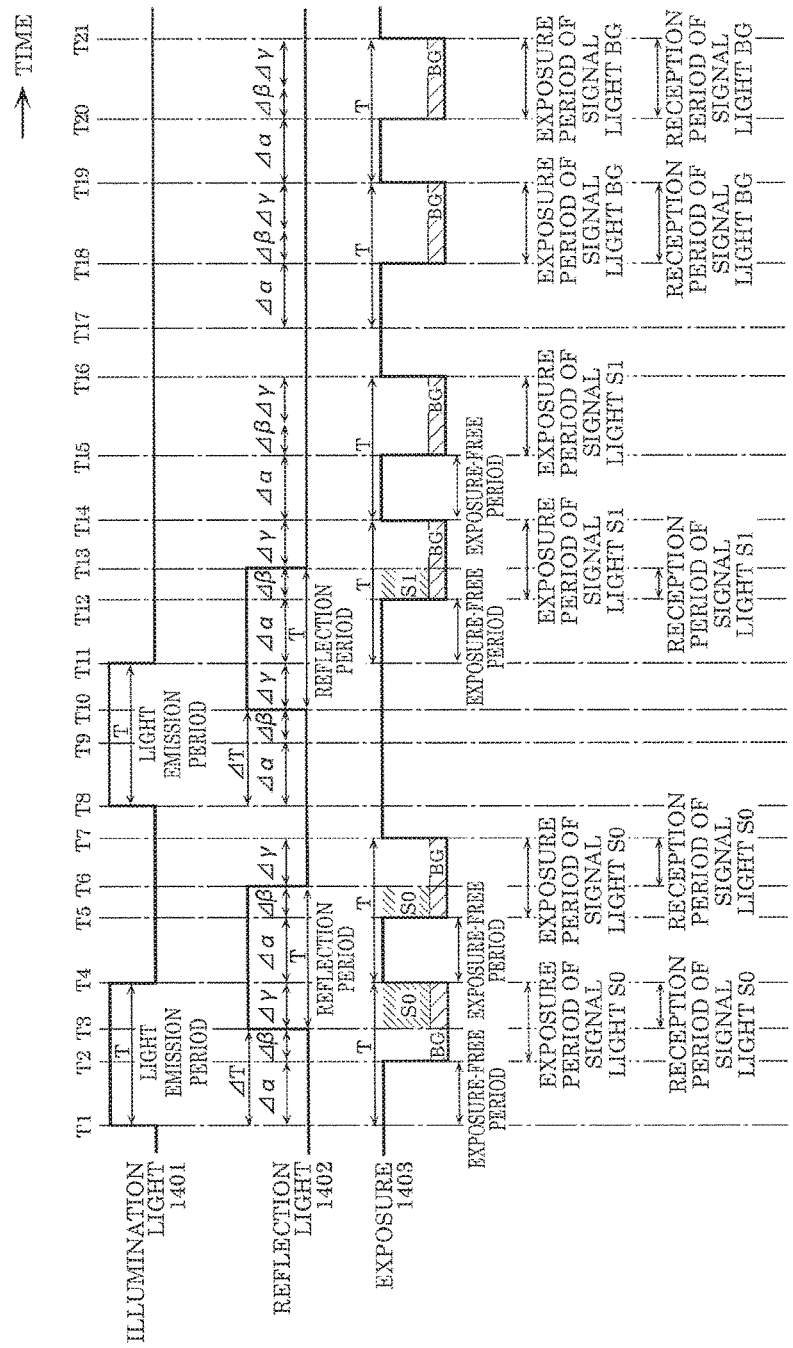
FIG. 14 is an exemplary timing chart when signal amounts S0, S1, and BG are obtained in the stated order using second signal light (adjustment light) and each signal amount is obtained once.

Similarly to the first signal light (adjustment light), signal amount S0 and signal amount S1 that are obtained based on the emission of the second signal light (light for distance measurement) include the signal amount caused by reflection of ambient light off surrounding objects. Thus, it is also possible to calculate the distance value by subtracting signal amount BG obtained during an unilluminated period from signal amount S0 and signal amount S1. This processing is illustrated by the timing chart in FIG. 14, and can be expressed by formula 24. FIG. 14 is an exemplary timing chart of illumination light 1401, reflection light 1402, and exposure 1403.

[Formula 24]

$$L = \frac{c \times \Delta\alpha}{2} + \frac{c \times (T - \Delta\alpha)}{2} \times \frac{S1 - BG}{S0 - BG} \quad (24)$$

Figure 15:
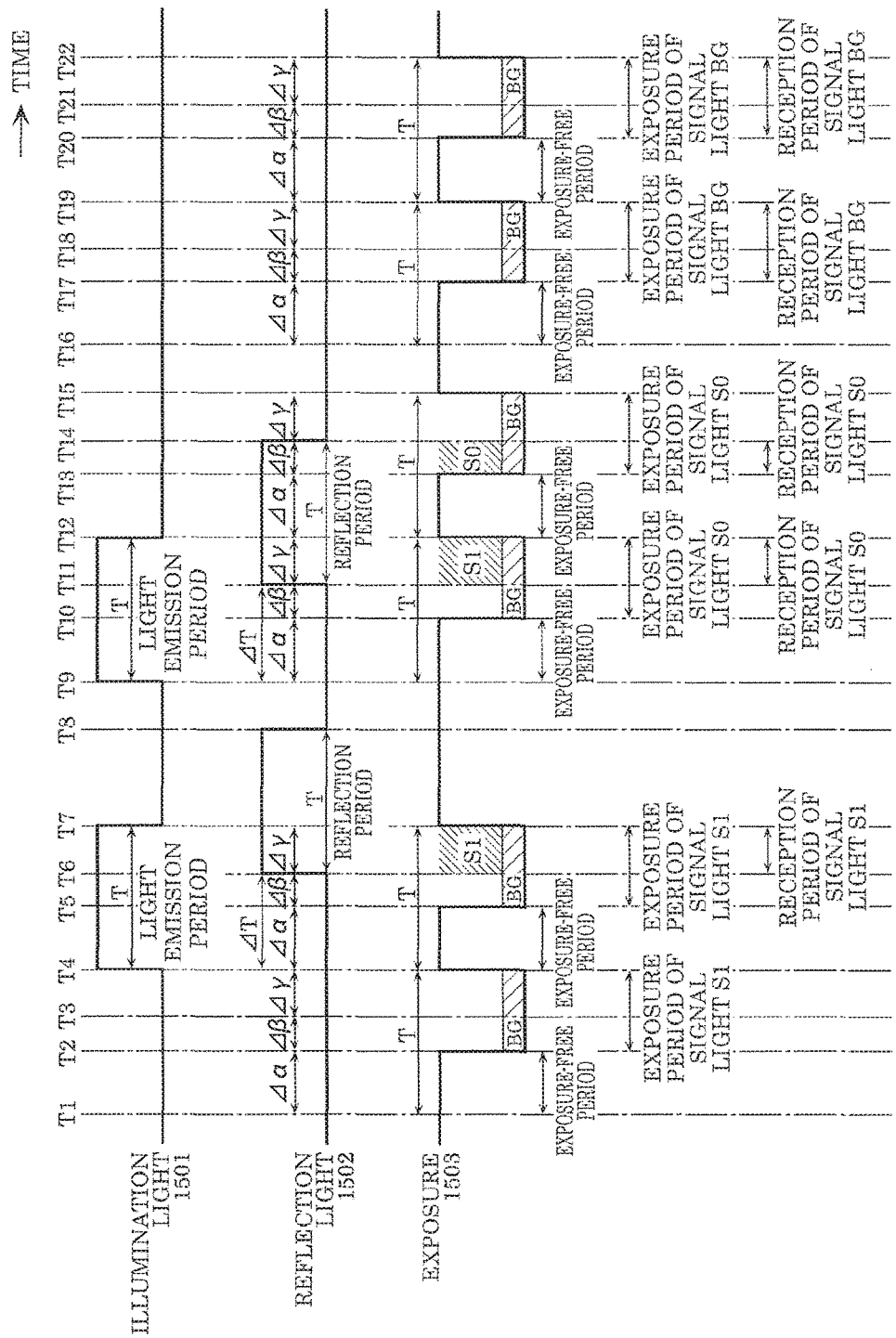
FIG. 15 is an exemplary timing chart when signal amounts S1, S0, and BG are obtained in the stated order using second signal light (adjustment light) and each signal amount is obtained once.

Moreover, the timing chart in FIG. 15 illustrates the case of adopting a method of obtaining a signal amount by making the exposure start time of signal amount S1 earlier than the first illumination start time. FIG. 15 is an exemplary timing chart of illumination light 1501, reflection light 1502, and exposure 1503. In FIG. 15, distance L to the subject can be calculated by formula 35, which is derived from formulae 25 to 34. The calculation formula at the time of considering the signal amount generated from ambient light is shown by formula 36. Variables used in these formulae are similar to those in formulae 14 to 24.

[Formula 25]

$$S0 = K \times (\Delta\beta + \Delta\gamma) \quad (25)$$

[Formula 26]

$$S1 = K \times \Delta\gamma \quad (26)$$

[Formula 27]

$$L = c \times \frac{\Delta T}{2} \quad (27)$$

[Formula 28]

$$L = \frac{c \times (\Delta\alpha + \Delta\beta)}{2} \quad (\because \Delta T = \Delta\alpha + \Delta\beta) \quad (28)$$

[Formula 29]

$$L = \frac{c \times \Delta\alpha}{2} + \frac{c \times \Delta\beta}{2} \quad (29)$$

[Formula 30]

$$L = \frac{c \times \Delta\alpha}{2} + \frac{c \times \Delta\beta}{2} \times \frac{\Delta\beta + \Delta\gamma}{\Delta\beta + \Delta\gamma} \quad (30)$$

[Formula 31]

$$L = \frac{c \times \Delta\alpha}{2} + \frac{c \times (\Delta\beta + \Delta\gamma)}{2} \times \frac{\Delta\beta}{\Delta\beta + \Delta\gamma} \quad (31)$$

[Formula 32]

$$L = \frac{c \times \Delta\alpha}{2} + \frac{c \times (\Delta\beta + \Delta\gamma)}{2} \times \frac{\Delta\beta + \Delta\gamma - \Delta\gamma}{\Delta\beta + \Delta\gamma} \quad (32)$$

[Formula 33]

$$L = \frac{c \times \Delta\alpha}{2} + \frac{c \times (\Delta\beta + \Delta\gamma)}{2} \times \left(1 - \frac{\Delta\gamma}{\Delta\beta + \Delta\gamma}\right) \quad (33)$$

[Formula 34]

$$L = \frac{c \times \Delta\alpha}{2} + \frac{c \times (T - \Delta\alpha)}{2} \times \left(1 - \frac{\Delta\gamma}{\Delta\beta + \Delta\gamma}\right) \quad (\because T = \Delta\alpha + \Delta\beta + \Delta\gamma) \quad (34)$$

[Formula 35]

$$L = \frac{c \times \Delta\alpha}{2} + \frac{c \times (T - \Delta\alpha)}{2} \times \left(1 - \frac{S1}{S0}\right) \quad (35)$$

[Formula 36]

$$L = \frac{c \times \Delta\alpha}{2} + \frac{c \times (T - \Delta\alpha)}{2} \times \left(1 - \frac{S1 - BG}{S0 - BG}\right) \quad (36)$$

In the above formulae, light emission period T and the exposure-free period ($\Delta\alpha$) are known. Thus, similarly to the first signal light (adjustment light), by obtaining signal amount S0, signal amount S1, and signal amount BG, range image generator 103 can calculate distance L to the subject and generate the range image (S809, S810).

Figure 16:
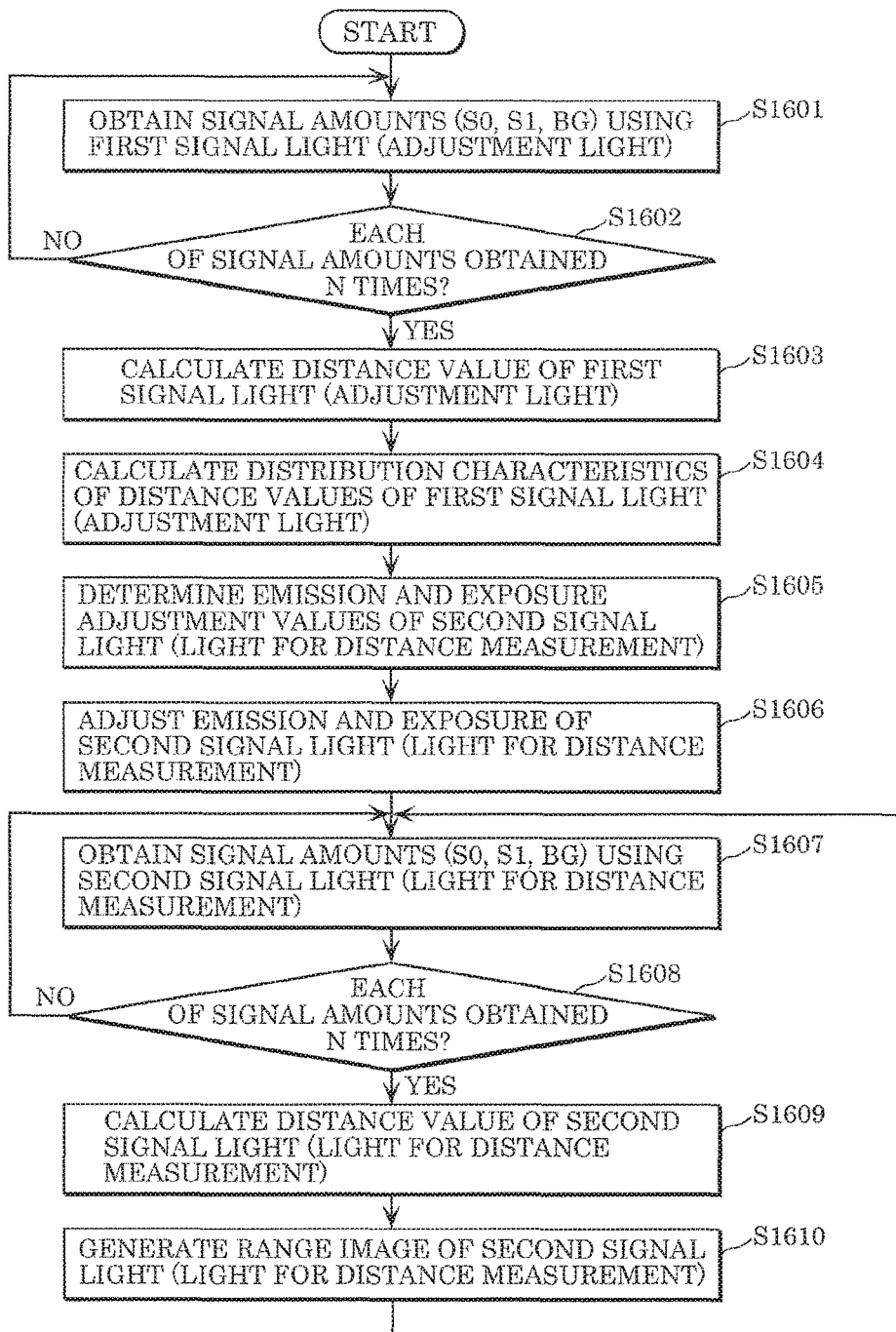
FIG. 16 is an exemplary flowchart illustrating a procedure different from the procedure shown in FIG. 8.

Additionally, as in the flowchart (S1601 to S1610) illustrated in FIG. 16, a method of repeating the generation of the range image using the second signal light (light for distance measurement) is also conceivable (i.e., repeating the processes indicated by S1607 to S1610).

Figure 17:
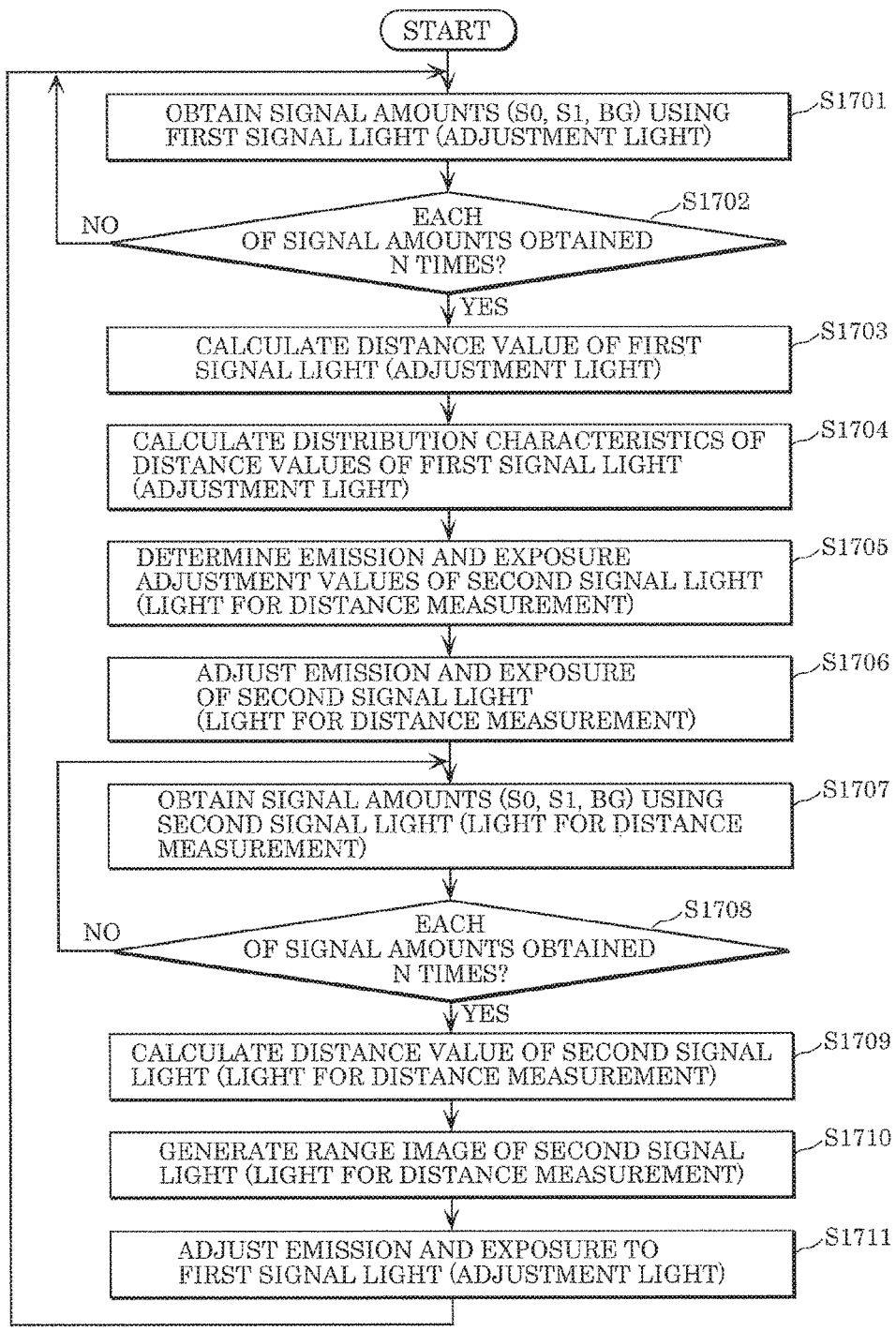
FIG. 17 is an exemplary flowchart when second signal light (light for distance measurement) is readjusted by alternate emissions of the first signal light (adjustment light) and the second signal light (light for distance measurement)
Figure 18:
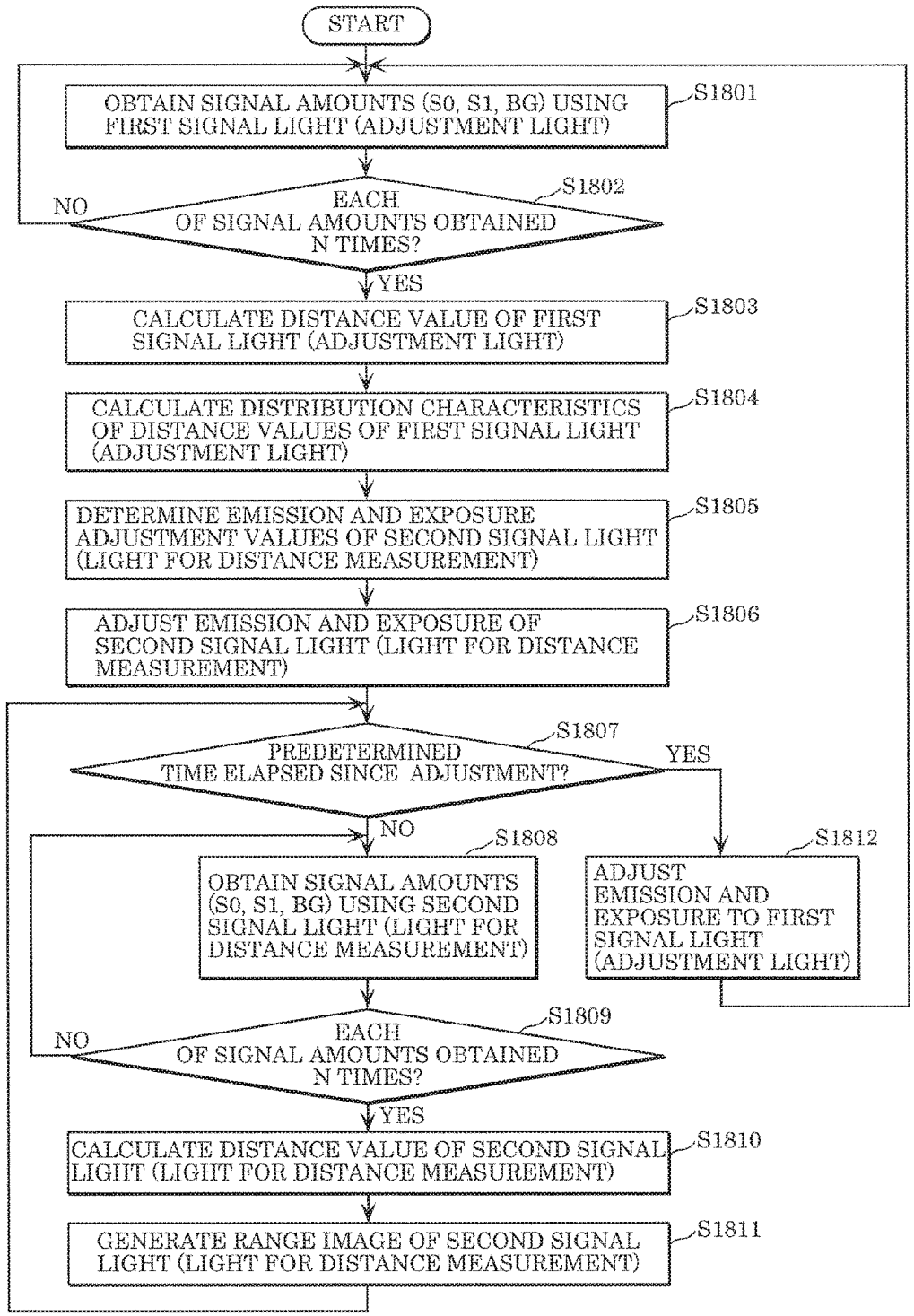
FIG. 18 is an exemplary flowchart when second signal light (light for distance measurement) is readjusted by emission of the first signal light (adjustment light) after a lapse of a predetermined period.
Figure 19:
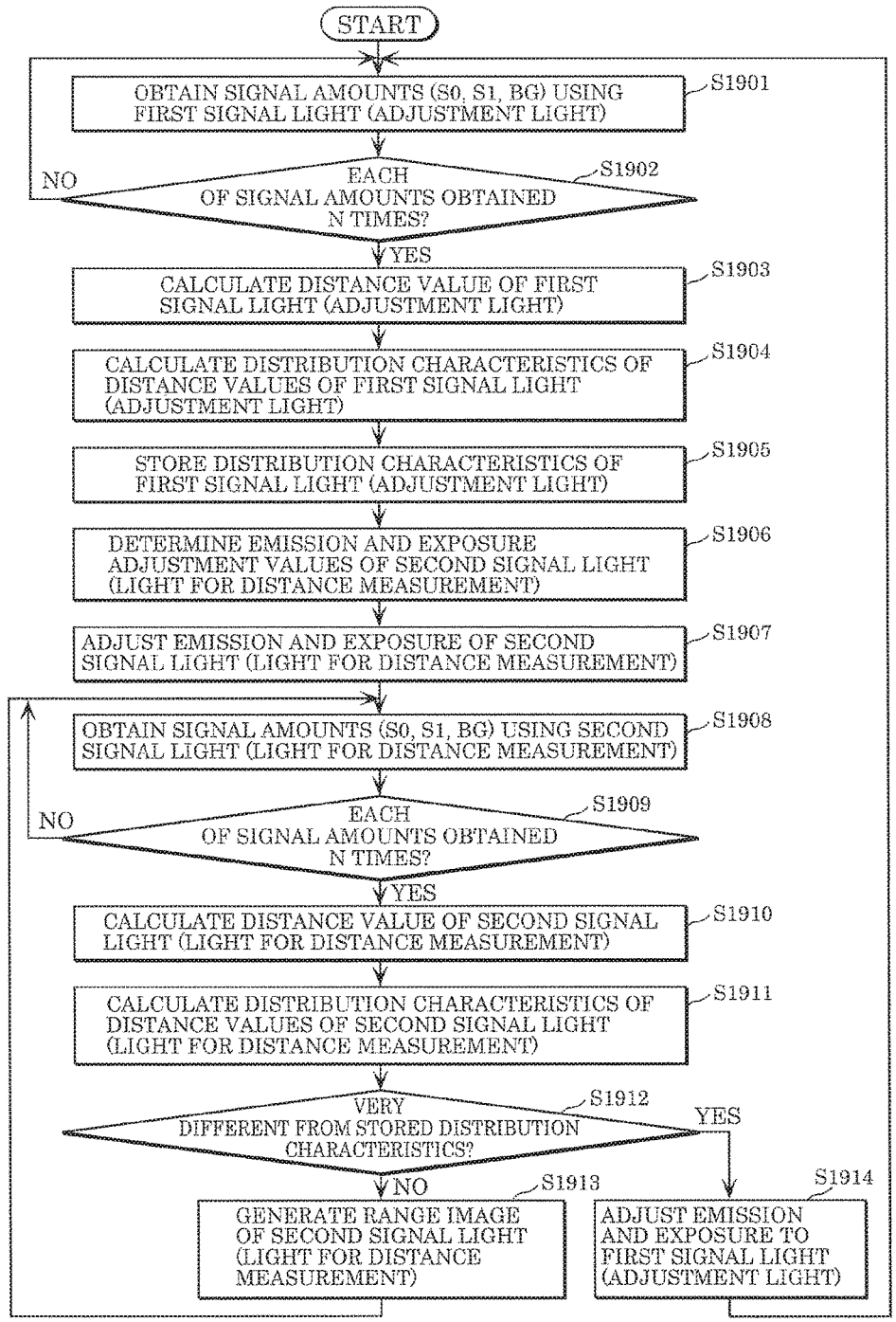
FIG. 19 is an exemplary flowchart when second signal light (light for distance measurement) is readjusted based on the result of comparing distribution characteristics of distance values calculated with first signal light (adjustment light) and distribution characteristics of distance values calculated with second signal light (light for distance measurement)

The following is a description of readjustment of the second signal light (light for distance measurement) with reference to FIG. 17 to FIG. 19.

In order to follow the movement of range imaging apparatus 100 and subject 903, the readjustment of the second signal light (light for distance measurement) is necessary. When readjusting the second signal light (light for distance measurement), light illuminator 101 and light receiver 102 are set to have values similar to the first signal light (adjustment light) using illumination controller 106 and exposure controller 107. There are several methods of determining timing of making the readjustment.

Method 1: as in S1701 to S1711 in FIG. 17, the emission of the first signal light (adjustment light) and that of the second signal light (light for distance measurement) are alternated, thereby readjusting the second signal light (light for distance measurement). Similarly to the method described with reference to FIG. 8, after the emission and exposure of the second signal light (light for distance measurement) are adjusted based on the result obtained from the first signal light (adjustment light), the range image is generated using the second signal light (light for distance measurement) (S1701 to S1710). Subsequently, the emission and exposure are adjusted to the first signal light (adjustment light) (S1711). Using the first signal light (adjustment light), the adjustment of the second signal light (light for distance measurement) is made again.

Method 2: as in S1801 to S1812 in FIG. 18, the first signal light (adjustment light) is emitted at fixed time intervals, thereby readjusting the second signal light (light for distance measurement). Similarly to the method described with reference to FIG. 8, the emission and exposure of the second signal light (light for distance measurement) are adjusted based on the result obtained from the first signal light (adjustment light) (S1801 to S1806). From when the adjustment of the second signal light (light for distance measurement) is ended, time measurement is started. If a predetermined period has not elapsed since the adjustment, the range image is generated repeatedly using the second signal light (light for distance measurement) (S1808 to S1811). If a predetermined period has elapsed, then the process returns to the emission and exposure of the first signal light (adjustment light) (S1812). Using the first signal light (adjustment light), the adjustment of the second signal light (light for distance measurement) is made again.

Method 3: as in S1901 to S1914 in FIG. 19, the distribution characteristics calculated using the first signal light (adjustment light) and those calculated using the second signal light (light for distance measurement) are compared. If these two distribution characteristics are different, the second signal light (light for distance measurement) is readjusted. Similarly to the method described with reference to FIG. 8, the distribution characteristics of the distance value are calculated using the first signal light (adjustment light) (S1901 to S1904), and then stored (S1905). Thereafter, the second signal light (light for distance measurement) is adjusted, and the distribution characteristics of the distance value are calculated using the second signal light (light for distance measurement) (S1906 to S1911). The distribution characteristics calculated using the first signal light (adjustment light) and those calculated using the second signal light (light for distance measurement) are compared (S1912). If histograms of these two are not very different, the range image is generated (S1913). If they are very different, then the process returns to the emission and exposure of the first signal light (adjustment light) (S1914). Using the first signal light (adjustment light), the adjustment of the second signal light (light for distance measurement) is made again. For example, when FIG. 12A illustrates the distribution characteristics calculated using the first signal light and FIG. 12B illustrates the distribution characteristics calculated using the second signal light, frequencies of range 10-11 and range 11-12 are higher in FIG. 12B than in FIG. 12A, so that it is assumed that another subject should have entered here. In this case, when a predetermined value is set and the difference in frequency in a specific range exceeds the predetermined value, it is considered that the distribution characteristics are very different. Alternatively, when a range with the highest frequency shifts from range 8-9 to range 9-11, it is assumed that the subject should have moved.

The three methods described above can be performed independently or in combination.

Finally, with regard to the calculation of the distribution characteristics using the first signal light (adjustment light), the case where the signal amount is saturated will be explained.

Figure 20:
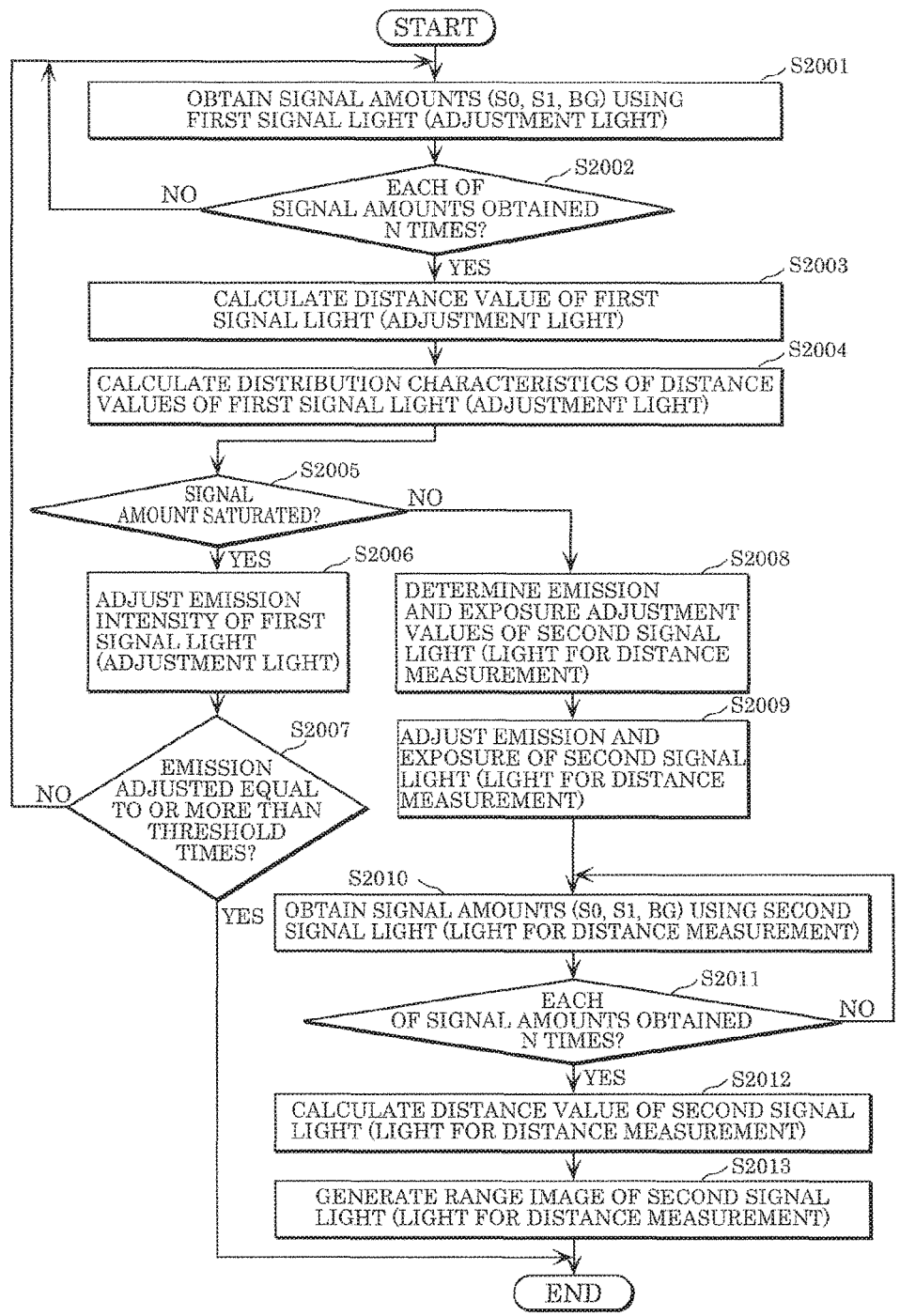
FIG. 20 is an exemplary flowchart when emission of first signal light (adjustment light) is adjusted in the case where a signal is saturated at the time of calculating distribution characteristics of distance values using the first signal light (adjustment light)

As in S2001 to S2013 in FIG. 20, similarly to the method described with reference to FIG. 8, the distribution characteristics of the distance value are calculated using the first signal light (adjustment light) (S2001 to S2004), and whether or not the signal amount is saturated is determined (S2005). It should be noted that this determination is made based on whether or not a signal output from the light receiver is output at its maximum value. This is because the signal output from the light receiver is set to be maximal at a charge lower than or equal to a maximum charge that can be received by the light receiver. If the signal amount is saturated, an illumination intensity of the first signal light (adjustment light) is reduced (S2006). Then, the distribution characteristics are calculated again using the first signal light (adjustment light). If the illumination intensity is adjusted equal to or more than predetermined times, it is determined that reflectivity of the subject is abnormally high, and the process is ended (S2007). If the signal amount is not saturated, the distance value using the first signal light (adjustment light) is adjusted using the second signal light (light for distance measurement). The range image is generated using the adjusted second signal light (light for distance measurement) (S2008 to S2013).

Additionally, the method of readjusting the second signal light (light for distance measurement) may be combined with the method described above.

The processing as described above makes it possible to measure the distance to the subject and generate a highly accurate range image according to a position of the subject.

Embodiment 2

The following is a description of Embodiment 2, with reference to the accompanying drawings. It should be noted that the description overlapping Embodiment 1 will be omitted.

Embodiment 2 is different from Embodiment 1 in the number of the adjustment values calculated by signal adjuster 105 in FIG. 1, and similar to Embodiment 1 in that the distance to the subject is measured using the TOF system and that the distance to the subject is measured (the range image is generated) using the first signal light (adjustment light) and the second signal light (light for distance measurement).

Now, a specific procedure will be described. First, the procedure is similar to the method described above in Embodiment 1, and follows the procedure illustrated in FIG. 8. Light illuminator 101 emits first signal light (adjustment light) toward a subject, light receiver 102 receives reflection light resulting from reflection of the first signal light (adjustment light) off the subject, and signal amount S0 and signal amount S1 (further signal amount BG as needed) are obtained N times (N is a natural number). Based on the obtained signal amounts, range image generator 103 generates a range image. Based on the range image, distance value distribution analyzer 104 calculates distribution characteristics of distance values. Based on the calculated distribution characteristics, signal adjuster 105 calculates adjustment values of illumination controller 106 and exposure controller 107.

Based on the distribution characteristics of the distance values calculated by distance value distribution analyzer 104, signal adjuster 105 calculates the adjustment values of illumination controller 106 and exposure controller 107. More specifically, signal adjuster 105 calculates a farthest distance (F) and a nearest distance (N) based on the distribution characteristics, calculates an illumination intensity (E) based on the farthest distance (F), calculates an exposure-free period ($\Delta\alpha$) based on the nearest distance (N), calculates exposure start time (EXS) based on the exposure-free period ($\Delta\alpha$), calculates an illumination period (T) based on the farthest distance (F) and the nearest distance (N), calculates an exposure period (EXT) based on the illumination period (T), and calculates illumination count (EC) and exposure count (EXC) based on the illumination intensity (E) and the illumination period (T).

Similarly to Embodiment 1, the method for determining the adjustment values can include a method of determining an adjustment value by a maximum value, an average value and threshold setting, and a local maximum value, etc., of a signal amount indicated by the distribution characteristics, and a method of providing a signal amount adjustment table in signal adjuster 105 and determining the adjustment value in correspondence with the result of distribution characteristics.

Hereinafter, each of the adjustment values will be described.

The farthest distance (F) is the farthest depth at which a subject is assumed to be present, whereas the nearest distance (N) is the nearest depth at which a subject is assumed to be present. The farthest distance (F) and the nearest distance (N) vary depending on the distance from an imaging device such as a camera to the subject. In other words, the nearest distance (N) decreases as the subject lies closer, and the farthest distance (F) increases as the subject lies farther.

The illumination intensity (E) is the intensity of signal light for illumination, and calculated based on the farthest distance (F). When the subject lies farther, the farthest distance (F) increases, and thus the illumination intensity (E) is raised so as to prevent the deterioration of the S/N ratio. On the other hand, when the subject lies closer, the farthest distance (F) decreases, and thus the illumination intensity (E) is reduced so as to prevent the saturation of the signal amount obtained from reflection light. It is assumed that the illumination intensity (E) should be adjusted to a saturation limit.

The exposure-free period ($\Delta\alpha$) is a period for adjusting exposure timing of reflection light, and calculated based on the nearest distance (N). The exposure-free period ($\Delta\alpha$) shortens with a decrease in the nearest distance (N), and vice versa.

The exposure start time (EXS) is time of starting exposure of reflection light, and calculated based on the exposure-free period ($\Delta\alpha$). The exposure start time (EXS) gets later with an increase in the exposure-free period ($\Delta\alpha$), and vice versa.

The illumination period (T) is a period during which signal light is emitted, and calculated based on an absolute value of the difference between the farthest distance (F) and the nearest distance (N). When the difference between the farthest distance (F) and the nearest distance (N) has a small value and the illumination period (T) is short, the depth range for distance measurement is narrow. On the other hand, when the difference between the farthest distance (F) and the nearest distance (N) has a large value and the illumination period (T) is long, the depth range for distance measurement is wide.

The exposure period (EXT) is a period during which reflection light resulting from the reflection of signal light off the subject is exposed. The exposure period (EXT) increases in keeping with the illumination period (T), and vice versa. Additionally, the exposure period (EXT) is twice as long as the illumination period (T).

The illumination count (EC) is the number of times each signal amount is obtained, and calculated based on the illumination intensity (E) and the illumination period (T). The adjustment of the illumination intensity (E) and the illumination period (T) avoids unnecessary exposure, but reduces the signal amount to be obtained, leading to deterioration of an S/N ratio. Accordingly, by providing the illumination count (EC) to control the number of times each signal amount is obtained, the deterioration of the S/N ratio is prevented.

A total illumination amount is a product of the illumination intensity (E), the illumination period (T) and the illumination count (EC). Since the total illumination amount varies depending on the reflectivity of the subject, it is adjusted to be close to its limit where a light reception amount of a pixel receiving the largest amount of light is saturated, for example.

The exposure count (EXC) is the number of times of exposure to reflection light, and calculated based on the illumination intensity (E) and the illumination period (T). Furthermore, the exposure count (EXC) is equal to the illumination count (EC).

The above adjustment values are used to adjust the second signal light (light for distance measurement). The illumination intensity (E), the illumination period (T), and the illumination count (EC) are values adjusted by illumination controller 106, and the exposure period (EXT), the exposure start time (time of day when exposure is started) (EXS), and the exposure count (EXC) are values adjusted by exposure controller 107.

In this manner, the depth at which the subject is present is determined based on the distribution characteristics of the distance value so that only the reflection light at that depth is exposed, thereby making it possible to reduce the signal amount to be obtained. On the other hand, the reduction of the signal amount brings about the deterioration of the S/N ratio, lowering the accuracy of the distance value. In view of this, the illumination intensity (E), the illumination period (T), and the illumination count (EC) have to be determined. Moreover, depending on the distribution characteristics of the distance value obtained using the first signal light (adjustment light), the first signal light (adjustment light) and the second signal light (light for distance measurement) may have the same illumination intensity (E), illumination period (T), illumination count (EC), exposure period (EXT), exposure start time (EXS), and exposure count (EXC).

It should be noted that the adjustment values described above may be adjusted alone or in combination.

Next, the distance measurement of a subject using the second signal light (light for distance measurement) will be described.

Similarly to Embodiment 1, light illuminator 101 emits the adjusted second signal light (light for distance measurement) toward the subject, light receiver 102 receives the reflection light resulting from the reflection of the second signal light (light for distance measurement) off the subject, and range image generator 103 calculates the range image of the subject based on the received signal amount.

Figure 21:
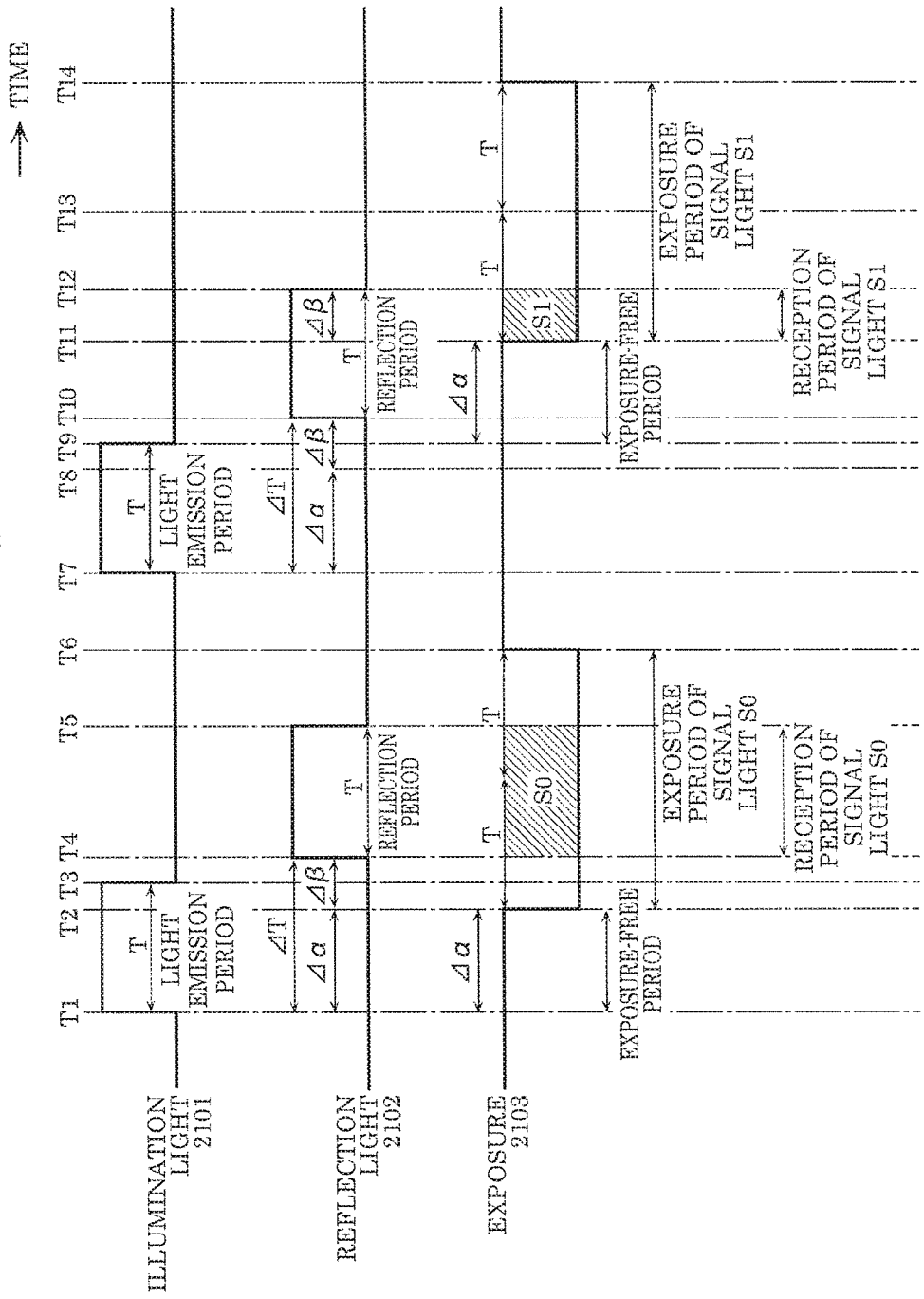
FIG. 21 is an exemplary timing chart when signal amounts S0 and S1 are obtained in the stated order using second signal light (adjustment light) and each signal amount is obtained once in Embodiment 2 of the present disclosure.

With reference to the timing chart in FIG. 21, a specific driving method using the second signal light (light for distance measurement) will be described. FIG. 21 is an exemplary timing chart of illumination light 2101, reflection light 2102, and exposure 2103. Although FIG. 21 represents the case in which it is determined that the illumination count (EC)=the exposure count (EXC)=1, the same will apply to the case of emitting the signal light N times (N is a natural number).

As illustrated in the timing chart of illumination light 2101, time T1 indicates a first illumination start time, time T3 indicates a first illumination end time, and a period from time T1 to time T3 indicates a first light emission period. Time T7 indicates a second illumination start time, time T9 indicates a second illumination end time, and a period from time T7 to time T9 indicates a second light emission period. Although the first light emission period and the second light emission period are equal in length, namely, time period T in this chart, there is no particular limitation to this.

As illustrated in the timing chart of reflection light 2102, time T4 indicates a first reflection start time, time T5 indicates a first reflection end time, and a period from time T4 to time T5 indicates a first reflection period. Time T10 indicates a second reflection start time, time T12 indicates a second reflection end time, and a period from time T10 to time T12 indicates a second reflection period. Although the light emission period and the reflection period are equal in length, namely, time period T in this chart, there is no particular limitation to this.

As illustrated in the timing chart of exposure 2103, time T2 indicates a first exposure start time, time T6 indicates a first exposure end time, and a period from time T2 to time T6 indicates a first exposure period (a reception period of signal light S0). Time T11 indicates a second exposure start time, time T14 indicates a second exposure end time, and a period from time T11 to time T14 indicates a second exposure period (a reception period of signal light S1). Although the first exposure period and the second exposure period are equal in length, namely, time period 2T in this chart, there is no particular limitation to this.

Furthermore, as illustrated by exposure 2103, a period from time T4 to time T5 indicates a first reflection light reception period (a reception period of signal light S0), and S0 indicates a signal amount obtained during the first reflection light reception period. Moreover, a period from time T11 to time T12 indicates a second reflection light reception period (a reception period of signal light S1), and S1 indicates a signal amount obtained during the second reflection light reception period.

In addition, a period from time T1 to time T2 and a period from time T9 to time T11 are the exposure-free period ($\Delta\alpha$) and equal in length. However, there is no particular limitation to this.

In this chart, the first exposure start time (time T2) is timing at which the exposure-free period ($\Delta\alpha$) has passed since the first illumination start time (time T1), and the second exposure start time (time T11) is timing at which the exposure-free period ($\Delta\alpha$) has passed since the second illumination end time (time T9). However, there is no particular limitation to these.

Now, the following is a description of how to calculate the distance value when exposure-free period $\Delta\alpha$ is provided in the second signal light (light for distance measurement). Distance L to the subject can be expressed by formula 44, which is derived from formulae 37 to 43, where T indicates the light emission period, c indicates the light speed, $\Delta T$ indicates a period from when signal light is emitted and reaches the subject to when the signal light reflects off the subject and is received by light receiver 102, $\Delta\alpha$ indicates the exposure-free period, and $\Delta\beta$ indicates the difference between $\Delta T$ and $\Delta\alpha$ ($\Delta\beta = \Delta T - \Delta\alpha$).

[Formula 37]
$$S0 = K \times T \quad (37)$$

[Formula 38]
$$S1 = K \times \Delta\beta \quad (38)$$

[Formula 39]
$$L = c \times \frac{\Delta T}{2} \quad (39)$$

[Formula 40]
$$L = \frac{c \times (\Delta\alpha + \Delta\beta)}{2} \quad (\because \Delta T = \Delta\alpha + \Delta\beta) \quad (40)$$

[Formula 41]
$$L = \frac{c \times \Delta\alpha}{2} + \frac{c \times \Delta\beta}{2} \quad (41)$$

[Formula 42]
$$L = \frac{c \times \Delta\alpha}{2} + \frac{c \times \Delta\beta}{2} \times \frac{T}{T} \quad (42)$$

[Formula 43]
$$L = \frac{c \times \Delta\alpha}{2} + \frac{c \times T}{2} \times \frac{\Delta\beta}{T} \quad (43)$$

[Formula 44]
$$L = \frac{c \times \Delta\alpha}{2} + \frac{c \times T}{2} \times \frac{S1}{S0} \quad (44)$$

Figure 22:
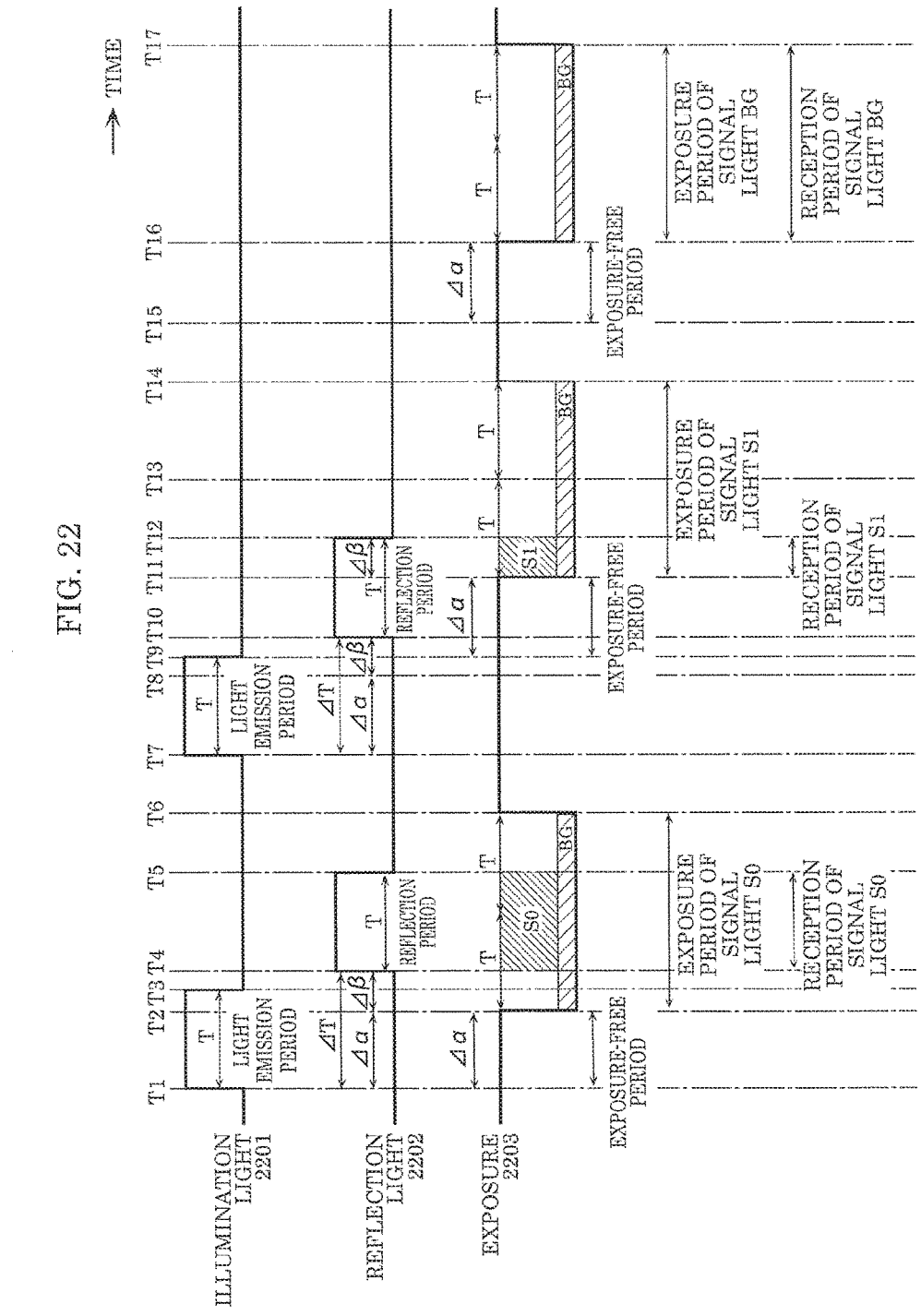
FIG. 22 is an exemplary timing chart when signal amounts S0, S1, and BG are obtained in the stated order using second signal light (adjustment light) and each signal amount is obtained once.

Moreover, similarly to the first signal light (adjustment light), signal amount S0 and signal amount S1 include the signal amount of the reflection light resulting from reflection of ambient light off surrounding objects. Thus, it is also possible to calculate the distance value by subtracting signal amount BG obtained during an unilluminated period from signal amount S0 and signal amount S1. This processing is illustrated by the timing chart in FIG. 22. FIG. 22 is an exemplary timing chart of illumination light 2201, reflection light 2202, and exposure 2203. Distance L to the subject can be expressed by formula 45.

[Formula 45]
$$L = \frac{c \times \Delta\alpha}{2} + \frac{c \times T}{2} \times \frac{S1 - BG}{S0 - BG} \quad (45)$$

Figure 23:
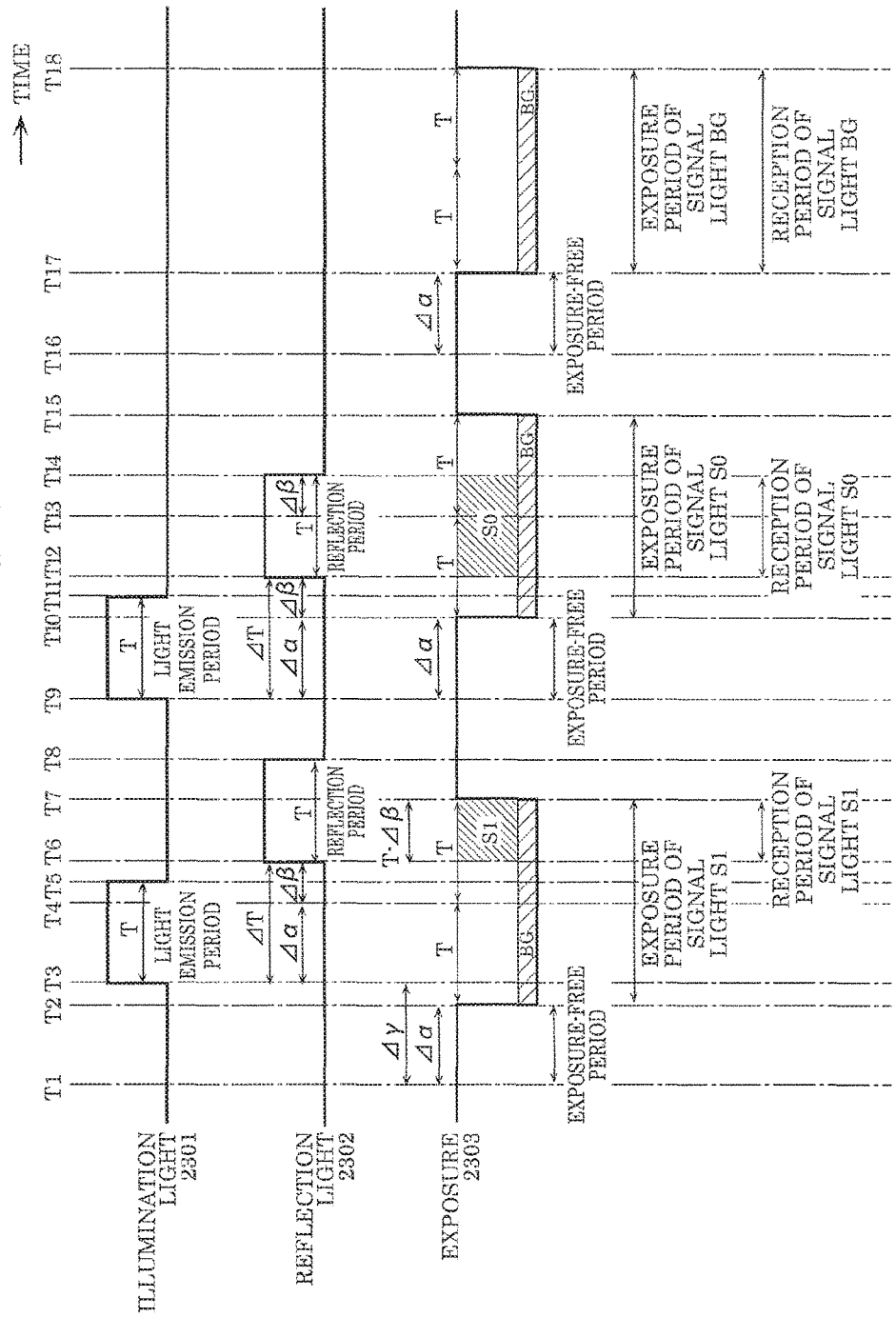
FIG. 23 is an exemplary timing chart when signal amounts S1, S0, and BG are obtained in the stated order using second signal light (adjustment light) and each signal amount is obtained once.

FIG. 23 is an exemplary timing chart of illumination light 2301, reflection light 2302, and exposure 2303. It may be possible to set the exposure start time of signal amount S1 earlier than the first illumination start time as illustrated in the timing chart of FIG. 23, and when obtaining the signal light, calculate distance L to the subject by the calculation formula shown in formula 56, which is derived from formulae 46 to 55. The calculation formula in the case of considering the signal amount generated from ambient light is shown by formula 57.

[Formula 46]
$$S0 = K \times T \quad (46)$$

[Formula 47]
$$S1 = K \times \Delta\beta \quad (47)$$

[Formula 48]
$$L = c \times \frac{\Delta T}{2} \quad (48)$$

[Formula 49]
$$L = \frac{c \times (\Delta\alpha + \Delta\beta)}{2} \quad (\because \Delta T = \Delta\alpha + \Delta\beta) \quad (49)$$

[Formula 50]
$$L = \frac{c \times \Delta\alpha}{2} + \frac{c \times \Delta\beta}{2} \quad (50)$$

[Formula 51]
$$L = \frac{c \times \Delta\alpha}{2} + \frac{c \times \Delta\beta}{2} \times \frac{T}{T} \quad (51)$$

[Formula 52]
$$L = \frac{c \times \Delta\alpha}{2} + \frac{c \times T}{2} \times \frac{\Delta\beta}{T} \quad (52)$$

[Formula 53]
$$L = \frac{c \times \Delta\alpha}{2} + \frac{c \times T}{2} \times \frac{\Delta\beta + T - T}{T} \quad (53)$$

[Formula 54]
$$L = \frac{c \times \Delta\alpha}{2} + \frac{c \times T}{2} \times \frac{T - (T - \Delta\beta)}{T} \quad (54)$$

[Formula 55]
$$L = \frac{c \times \Delta\alpha}{2} + \frac{c \times T}{2} \times \left(1 - \frac{T - \Delta\beta}{T}\right) \quad (55)$$

[Formula 56]
$$L = \frac{c \times \Delta\alpha}{2} + \frac{c \times T}{2} \times \left(1 - \frac{S1}{S0}\right) \quad (56)$$

[Formula 57]
$$L = \frac{c \times \Delta\alpha}{2} + \frac{c \times T}{2} \times \left(1 - \frac{S1 - BG}{S0 - BG}\right) \quad (57)$$

As described above, values necessary for calculating distance value L to the subject are signal amounts (S0, S1, and BG), light emission period T, and exposure-free period $\Delta\alpha$. Since light emission period T and exposure-free period $\Delta\alpha$ are known, it is possible to measure the distance to the subject and generate the range image by obtaining the signal amounts (S0, S1, and BG) similarly to the first signal light (adjustment light).

Furthermore, similarly to Embodiment 1, the readjustment of the second signal light (light for distance measurement) and the case where the signal amount is saturated in the calculation of the distribution characteristics using the first signal light (adjustment light) may also be added to the processing in Embodiment 2. Since they have been already described in Embodiment 1, the redundant description will be omitted here.

The processing as described above makes it possible to measure the distance to the subject and generate a highly accurate range image according to a position of the subject.

The present disclosure can be provided not only as a range imaging apparatus including individual components in Embodiment 1 and Embodiment 2 but also as a program that causes a computer to execute a range imaging method including steps corresponding to the individual components included in the range imaging apparatus. In addition, such a program can be distributed via a recording medium represented by a USB or via the Internet.

It is needless to say that the embodiments described above are merely an example. In other words, a concept for which a patent protection is sought is a generic concept resulting from abstraction of the embodiments described above. It is needless to say that such a generic concept may be carried out (implemented or realized) through the above-described exemplary embodiments or through some other embodiments that are partially or entirely different from the above-described embodiments.

INDUSTRIAL APPLICABILITY

The range imaging apparatus disclosed herein adjusts the emission and exposure of the second signal light (light for distance measurement) based on the distribution characteristics of the distance value calculated based on the range image obtained using the first signal light (adjustment light), thereby generating a highly accurate range image, and can be used in various equipment such as digital audio visual (AV) equipment and a game machine that require gesture recognition and object recognition. The range imaging apparatus according to the present disclosure is applicable to not only the equipment described above but also any range imaging apparatuses capable of obtaining necessary distribution characteristics of distance information.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

What is claimed is:

1. A range imaging apparatus comprising:
   a light illuminator that emits signal light from a light source toward a subject;
   a light receiver that receives reflection light to obtain a signal amount, the reflection light resulting from reflection of the signal light emitted by the light illuminator off the subject;
   a range image generator that calculates a distance value to the subject based on a time difference between illumination start time and light reception start time, and generates a range image;
   a distance value distribution analyzer that analyzes a distribution characteristic of the distance value calculated by the range image generator;
   an illumination controller that adjusts output of the signal light emitted by the light illuminator;
   an exposure controller that adjusts light reception by the light receiver; and
   a signal adjuster that calculates an adjustment value for the output and the light reception based on the distribution characteristic, and controls the illumination controller and the exposure controller,
   wherein the signal amount includes a plurality of signal amounts,
   the light illuminator emits the signal light toward the subject, the light receiver obtains the plurality of signal amounts at different timings, and the range image generator calculates the distance value to the subject based on a ratio between the plurality of signal amounts,
   the signal light emitted to generate the range image of the subject includes first signal light and second signal light, the first signal light being for calculating the adjustment value for output and light reception of the second signal light, and the second signal light being for generating the range image, and
   the signal adjuster calculates an exposure-free period that is a period during which exposure is not performed in a depth range where no subject is present, based on the distribution characteristic obtained through emission and light reception of the first signal light, and controls the exposure controller by adjusting exposure start time of the second signal light, based on the exposure-free period.

2. The range imaging apparatus according to claim 1, wherein the signal adjuster controls the illumination controller and the exposure controller by further adjusting as the adjustment value at least one of illumination intensity, an illumination period, an illumination count, an exposure period, and an exposure count of the second signal light based on the distribution characteristic obtained through the emission and the light reception of the first signal light.

3. The range imaging apparatus according to claim 2, wherein, in calculation of each of the plurality of signal amounts, the range image generator calculates the distance value using a total sum of the plurality of signal amounts obtained by repeating emission of the signal light toward the subject, reception of the reflection light, and the calculation of the signal amount.

4. The range imaging apparatus according to claim 3, wherein the signal adjuster determines the adjustment value based on any of a maximum value, an average value, a local maximum value, and a threshold of the signal amount indicated by the distribution characteristic or based on an adjustment value combination table provided in advance in the signal adjuster.

5. The range imaging apparatus according to claim 4, wherein the signal adjuster stores the distribution characteristic calculated using the first signal light at fixed time intervals in the distance value distribution analyzer, and readjusts the second signal light when difference between the distribution characteristic and the distribution characteristic that is calculated using the second signal light exceeds a set threshold.

6. A range imaging method comprising:
   (a) emitting, by a light illuminator, first signal light from a light source toward a subject, and receiving, by a light receiver, reflection light to obtain first signal amounts caused by light reception pixel by pixel at different timings, the reflection light resulting from reflection of the first signal light off the subject;
   (b) calculating a first distance value to the subject and generating a first range image based on a ratio between the first signal amounts;
   (c) analyzing a first distribution characteristic, the first distribution characteristic being a distribution characteristic of the first distance value calculated in (b);
   (d) calculating adjustment values regarding output and light reception of second signal light based on the first distribution characteristic, and adjusting at least one of the adjustment values regarding the output and the light reception of the second signal light;
   (e) adjusting the adjustment value regarding the output of the second signal light;
   (f) adjusting the adjustment value regarding the light reception of the second signal light;
   (g) at least after emission of the first signal light, emitting, by the light illuminator, the second signal light from the light source toward the subject, and receiving, by the light receiver, reflection light to obtain second signal amounts caused by light reception pixel by pixel at different timings, the reflection light resulting from reflection of the second signal light off the subject; and
   (h) calculating a second distance value to the subject and generating a second range image based on a ratio between the second signal amounts,
   wherein in (d), an exposure-free period that is a period during which exposure is not performed in a depth range where no subject is present is calculated based on the distribution characteristic obtained through emission and light reception of the first signal light, and exposure start time of the second signal light is adjusted based on the exposure-free period.

7. The range imaging method according to claim 6, wherein in (d), at least one of illumination intensity, an illumination period, an illumination count, an exposure period, and an exposure count of the second signal light is further adjusted as the adjustment value based on the distribution characteristic obtained through the emission and the light reception of the first signal light.

8. The range imaging method according to claim 6, wherein in (b) and (h), in calculation of each of the first signal amounts and the second signal amounts, the first distance value and the second distance value are calculated using a total sum of the first signal amounts and the second signal amounts obtained by repeating emission of the first signal light and the second signal light toward the subject, reception of the reflection light, and the calculation of the first signal amounts and the second signal amounts.

9. The range imaging method according to claim 8, wherein in (d), the adjustment value is determined based on any of a maximum value, an average value, a local maximum value, and a threshold of the first signal amounts indicated by the first distribution characteristic or based on an adjustment value combination table in (d).

10. The range imaging method according to claim 9, wherein (d) includes storing the first distribution characteristic calculated using the first signal light at fixed time intervals in (c), comparing the first distribution characteristic and a second distribution characteristic that is calculated using the second signal light, and when difference between the first distribution characteristic and the second distribution characteristic exceeds a set threshold, performing (a), (g), (b), (h), (c), and (d) again.

* * * * *